(12) United States Patent
Tagami et al.

(10) Patent No.: US 7,316,212 B2
(45) Date of Patent: Jan. 8, 2008

(54) CAM PHASE CONTROL SYSTEM FOR INTERNAL COMBUSTION ENGINE

(75) Inventors: Hiroshi Tagami, Saitama-ken (JP); Yuji Yasui, Saitama-ken (JP); Mitsunobu Saito, Saitama-ken (JP); Kosuke Higashitani, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/197,404

(22) Filed: Aug. 5, 2005

(65) Prior Publication Data

US 2006/0027197 A1 Feb. 9, 2006

(30) Foreign Application Priority Data

Aug. 6, 2004 (JP) ............................. 2004-230990

(51) Int. Cl.
*F01L 1/34* (2006.01)
(52) U.S. Cl. ............................. 123/90.17; 123/90.15; 123/90.31
(58) Field of Classification Search ............. 123/90.17, 123/90.31, 90.15

See application file for complete search history.

(56) References Cited

U.S. PATENT DOCUMENTS 6,526,930 B2\* 3/2003 Takahashi et al. ....... 123/90.17
2003/0131812 A1 7/2003 Hosoya

FOREIGN PATENT DOCUMENTS

| EP | 1 143 113 A2 | 10/2001 |
| EP | 1 533 483 A1 | 5/2005 |
| JP | 2004-137901 A | 5/2004 |
| WO | 2005/015325 A1 | 2/2005 |

\* cited by examiner

*Primary Examiner*—Zelalem Eshete
(74) *Attorney, Agent, or Firm*—Arent Fox LLP

(57) ABSTRACT

A cam phase control system for an internal combustion engine, which is capable of suppressing deviation of the cam phase which is caused by a sudden change in the engine speed due to the structure of a variable cam phase mechanism, thereby securing excellent controllability and high control accuracy. The coma phase control system of the engine comprise an ECU and an electromagnetic variable cam phase mechanism. The ECU calculates an SLD control input for causing the cam phase to converge to a target cam phase by equations (1) to (6), calculates a gain-adjusted value by modulating the SLD control input by equations (20) to (25), calculates a correction value according to the engine speed NE, and calculates a control input for controlling the variable cam phase mechanism by correcting the gain-adjusted value by the correction value.

6 Claims, 13 Drawing Sheets

CAM PHASE CONTROL SYSTEM FOR INTERNAL COMBUSTION ENGINE

BACKGROUND OF THE INVENTION

1. Field of the Invention

This invention relates to a cam phase control system for an internal combustion engine, for controlling a cam phase, as a phase of at least one of an intake cam and an exhaust cam relative to a crankshaft of the engine.

2. Description of the Related Art

As the cam phase control system of this kind, the present assignee has already proposed one disclosed in Japanese Patent Application No. 2004-70312. At one end of an intake camshaft of the engine, there is provided a hydraulic variable cam phase mechanism. The variable cam phase mechanism is comprised of a housing integrally formed with a sprocket, vanes received in the housing, an advancing hydraulic chamber and a retarding hydraulic chamber formed between the housing and the vane, and an electromagnetic control valve that changes hydraulic pressures supplied to the chambers. Further, the sprocket is connected to a crankshaft via a timing belt, and the vanes are connected to the intake camshaft for rotation in unison therewith.

In the variable cam phase mechanism constructed as above, the hydraulic pressures supplied to the advancing hydraulic chamber and the retarding hydraulic chamber are varied by the electromagnetic control valve to thereby steplessly vary the phase between the sprocket and the intake camshaft, i.e. the phase (hereinafter referred to as "the cam phase") Cain of the intake cam relative to the crankshaft. Further, the electromagnetic control valve closes oil passages to thereby maintain the hydraulic pressures in the advancing and retarding hydraulic chambers, whereby the cam phase Cain is held at a value assumed then.

Further, the cam phase control system controls the cam phase Cain via the variable cam phase mechanism such that the cam phase Cain converges to a target cam phase Cain_cmd, and includes a crank angle sensor, a cam angle sensor, and an ECU. In the cam phase control system, the ECU controls the cam phase Cain in the following manner: The cam phase Cain is calculated based on detections signals from the crank angle sensor and the cam angle sensor, and the target cam phase Cain_cmd is calculated based on engine speed NE and an accelerator opening AP.

Further, with a target value filter-type two-degree-of-freedom control algorithm, a control value Rcain is calculated for causing the cam phase Cain to converge to the target cam phase Cain_cmd, and a control input Ucain to the variable cam phase mechanism is calculated by modulating the control value Rcain with a modulation algorithm based on a $\Delta\Sigma$ modulation algorithm. In the modulation algorithm, the control input Ucain has a modulation range thereof set to a predetermined value, and a value Ucain_off_adp as the center of the modulation range is set according to the value of the control value Rcain.

By calculating the control input Ucain as described above, even when the control value Rcain is varied or fluctuated due to heat generated by the solenoid of the control valve, variation in operating characteristics of individual variable cam phase mechanisms, and aging, it is possible to calculate the control input Ucain as such a value as will cause frequent occurrence of a switching behavior peculiar to the $\Delta\Sigma$ modulation algorithm, while limiting the modulation range of the control input Ucain to a relatively small value. As a result, it is possible to obtain high control accuracy in the cam phase control.

Further, as the variable cam phase mechanism, the present assignee has already proposed one described in Japanese Patent Application No. 2003-289910. The variable cam phase control mechanism, which is of an electromagnetic type, is disposed between a sprocket and an intake camshaft, and includes an electromagnet and a return spring. In the variable cam phase mechanism, the electromagnetic force of the electromagnet is varied against the urging force of the return spring, whereby the cam phase Cain is steplessly varied. Further, when the electromagnetic force is held constant, the cam phase Cain is held at a value in which the electromagnetic force and the urging force of the return spring are balanced.

The latter electromagnetic variable cam phase mechanism is advantageous over the hydraulic type in that dead time is shorter, and a higher responsiveness can be secured. Therefore, it is envisaged to apply the latter electromagnetic variable cam phase mechanism to the former cam phase control system. However, in this case, there can arise the following problems:

Since the variable cam phase mechanism is provided between the intake camshaft and the sprocket, and at the same time the sprocket is connected to the crankshaft via the timing belt (or timing chain), when a sudden accelerator pedal operation, a sudden brake pedal operation, or a clutch operation during a shift change causes a sudden increase in the engine speed, there can be caused a sudden change in the inertial force of the timing belt, the crankshaft etc. acting on the sprocket. In the electromagnetic variable cam phase mechanism, the cam phase Cain is varied by changing the relative magnitude relationship between the electromagnetic force and the urging force of the return spring, and hence if there occurs a sudden change in the inertial force, the magnitude relationship deviates from the proper relationship determined by the control input, which sometimes causes the cam phase Cain to deviate from a value corresponding to the control input. As a result, the convergence of the cam phase Cain to the target cam phase Cain_cmd is degraded, and as the control accuracy of the cam phase control lowers, the combustion state and the exhaust emission can be degraded.

As one method of solving the above problems, it is contemplated to set the modulation range of the control input Ucain to a relatively large range so as to accommodate a variation in the control value Rcain caused by deviation of the cam phase Cain. However, in this method, the size of the modulation range of the control input Ucain is reflected on the cam phase Cain itself, which can lower the controllability thereof on the contrary. The above problem also occurs when the $\Delta\Sigma$ modulation algorithm is replaced by a $\Delta$ modulation algorithm or $\Sigma\Delta$ modulation algorithm.

SUMMARY OF THE INVENTION

It is an object of the present invention to provide a cam phase control system for an internal combustion engine, which is capable of suppressing deviation of the cam phase which is caused by a sudden change in the engine speed due to the structure of a variable cam phase mechanism, thereby securing excellent controllability and high control accuracy.

To attain the above object, the present invention provides a cam phase control system for an internal combustion engine, for controlling a cam phase as a phase of at least one of an intake cam and an exhaust cam relative to a crankshaft, comprising:

a variable cam phase mechanism that changes a magnitude relationship between a first force that acts in a direction of advancing the cam phase and a second force that acts in a direction of retarding the cam phase, to thereby change the cam phase, and holds the first and second forces in a balanced relationship, to thereby hold the cam phase;

engine speed-detecting means for detecting an engine speed of the engine;

cam phase-detecting means for detecting the cam phase;

target cam phase-setting means for setting a target cam phase as a target to which the cam phase is controlled;

control value-calculating means for calculating a control value for causing the detected cam phase to follow up the target cam phase, with a predetermined control algorithm; and control input-calculating means for correcting the calculated control value according to the detected engine speed to thereby calculate a control input for controlling the variable cam phase mechanism.

With the configuration of the cam phase control system for an internal combustion engine, a control amount for causing the detected cam phase to follow up the target cam phase is calculated with a predetermined control algorithm, and the calculated control amount is corrected based on the engine speed, whereby a control input for controlling a variable cam phase mechanism is calculated. The variable cam phase mechanism changes the cam phase by changing the magnitude relationship between a first force acting in the direction of advancing the cam phase and a second force acting in the direction of retarding the same, and holds the cam phase by holding the first and second forces in a balanced state. Due to the structure of the variable cam phase mechanism, when a sudden change in the engine speed causes a sudden change in an inertial force acting on the variable cam phase mechanism, there is a possibility that the relationship between the first and second forces deviates from the proper state to cause the cam phase to deviate from a proper value corresponding to the control input. However, in the cam phase control system, since the control input is calculated as a value corrected by the correction value, even when a sudden change in the inertial force acting on the variable cam phase mechanism is caused by a sudden change in the engine speed, the influence thereof can be properly compensated for, and hence the relationship between the first and second forces acting on the variable cam phase mechanism can be maintained in a proper state. As a result, it is possible to suppress deviation of the cam phase which can be caused by a sudden change in the engine speed, whereby the excellent controllability and high control accuracy of the cam phase control can be secured. It should be noted that the term "calculate" used in the present specification as in "calculating a control value" and "calculates the control input" is not limited to computation by a program but includes generating an electric signal indicative of the control value or an electric signal indicative of the control input, using an electric circuit.

Preferably, the predetermined control algorithm of the control value-calculating means calculates a follow-up control value for causing the detected cam phase to follow up the target cam phase with a predetermined follow-up control algorithm, and modulates the calculated follow-up control value with an algorithm which is based on one of a $\Delta$ modulation algorithm, a $\Delta\Sigma$ modulation algorithm, and a $\Sigma\Delta$ modulation algorithm, to thereby calculate the control value.

With the configuration of this preferred embodiment, a follow-up control value for causing the detected cam phase to follow up the target cam phase is calculated with a predetermined follow-up control algorithm, and the control value is calculated by modulating the calculated follow-up control value with an algorithm which is based on at least one of a $\Delta$ modulation algorithm, a $\Delta\Sigma$ modulation algorithm, and a $\Sigma\Delta$ modulation algorithm. In general, when the cam phase is controlled via the variable cam phase mechanism such that the cam phase follows up a change in the target cam phase, if control is provided only with the follow-up control algorithm, there is a possibility that the controllability and the control accuracy are degraded due to the nonlinear characteristics of the variable cam phase mechanism. However, in the cam phase control system according to the preferred embodiment, the control value is calculated by modulating the follow-up control value calculated with the predetermined follow-up control algorithm, with the algorithm which is based on at least one of the $\Delta$ modulation algorithm, the $\Delta\Sigma$ modulation algorithm, and the $\Sigma\Delta$ modulation algorithm, and the control value thus calculated is corrected to thereby calculate the control input. Therefore, the control input can be calculated as a value which increases and decreases in a manner frequently repeatedly inverted within a predetermined range, whereby the cam phase control can be carried out while avoiding the influence of the nonlinear characteristics of the variable cam phase mechanism. As a result, it is possible to improve the controllability and control accuracy of the cam phase control.

Preferably, the control input-calculating means calculates a correction value for correcting the control value according to the engine speed, and the predetermined follow-up control algorithm of the control value-calculating means is an algorithm which is based on a controlled system model defining a relationship between the follow-up control value, the correction value, and the cam phase, the cam phase control system further comprising identification means for identifying model parameters of the controlled system model based on the follow-up control value, the correction value, and the cam phase, with a predetermined identification algorithm.

With the configuration of the preferred embodiment, the control input calculating means calculates a correction value for correcting the control value according to the engine speed, and the predetermined follow-up control algorithm of the control value-calculating means is an algorithm which is based on a controlled system model defining the relationship between the follow-up control value, the correction value, and the cam phase, and identification means identifies model parameters of the controlled system model based on the follow-up control value, the correction value, and cam phase, with a predetermined identification algorithm. In general, while performing the cam phase control using the controlled system model, due to a change in friction of the engine caused by the progress of warming up thereof, a variation in the dynamic characteristics among individual variable cam phase mechanisms, and aging, the dynamic characteristics of the controlled system model can deviate from the actual values. Further, when the controlled system model is constructed independently of the control value, since the control value is calculated according to the engine speed, it is recognized that the dynamic characteristics of the controlled system model are varied due to an increase or decrease in the range of variation in the engine speed, which can cause the dynamic characteristics of the controlled system model to be identified in a state deviated from the actual dynamic characteristics thereof. However, in the cam phase control system according to the preferred embodiment, the controlled system model is constructed as one defining the follow-up control value, the control value, and the cam phase, and the model parameters are identified with the predetermined identification algorithm which is based on the follow-up control value, the control value, and the cam phase. Therefore, by using an onboard identifier, for example, as the identification means, the dynamic characteristics of the controlled system model can be promptly adapted to the actual dynamic characteristics thereof while avoiding the adverse influence of a change in friction of the engine caused by the progress of warming up thereof, a variation in the dynamic characteristics among individual variable cam phase mechanisms, and aging. As a result, it is possible to improve the controllability and control accuracy of the cam phase control.

Preferably, the predetermined control algorithm of the control value-calculating means includes a predetermined response-specifying control algorithm.

In general, when the cam phase is controlled via the variable cam phase control system such that it follows up the target cam phase, due to a change in friction of the engine caused by the progress of warming up thereof, a variation in the dynamic characteristics among individual variable cam phase mechanisms, and aging, the cam phase can undergo an oscillating behavior, overshooting, and an error. This problem can be made conspicuous, even when the control value is corrected according to the engine speed, since the degree of correction increases if the range of variation in the engine speed is large. However, in the cam phase control system according to the preferred embodiment, the predetermined control algorithm of the control value-calculating means includes a predetermined response-specifying control algorithm, and hence it is possible to cause the cam phase to accurately and promptly follow up the target cam phase while preventing the oscillating behavior, overshooting, and an error from occurring. As a result, it is possible to improve the controllability and control accuracy of the cam phase control.

Preferably, the predetermined control algorithm of the control value-calculating means includes a predetermined two-degree-of-freedom control algorithm.

As described, when the cam phase is controlled via the variable cam phase control system such that it follows up the target cam phase, the cam phase undergoes an oscillating behavior, overshooting, and an error. This problem can be made conspicuous, even when the control value is corrected according to the engine speed, since the degree of correction increases if the range of variation in the engine speed is large. However, in the cam phase control system according to the preferred embodiment, the predetermined control algorithm of the control value-calculating means includes a predetermined two-degree-of-freedom control algorithm, and hence when a target value filter-type two-degree-of-freedom control algorithm, for example, is used as the two-degree-of-freedom control algorithm, it is possible to properly set the follow-up rate of the cam phase to the target cam phase with a target value filter algorithm, and at the same time properly set the behavior of follow-up of the cam phase to the target cam phase with a feedback control algorithm. Therefore, it is possible to cause the cam phase to accurately and promptly follow up the target cam phase while preventing the oscillating behavior, overshooting, and an error from occurring. As a result, it is possible to improve the controllability and control accuracy of the cam phase control.

Preferably, the control input-calculating means calculates a correction value for correcting the control value, according to the engine speed, the cam phase control system further comprising disturbance estimated value-calculating means for calculating a disturbance estimated value for compensating for disturbance received by the variable cam phase mechanism based on the correction value, with a predetermined estimation algorithm, and the control value-calculating means calculates the control value further based on the calculated disturbance estimated value.

With the configuration of the preferred embodiment, a correction value for correcting the control value is calculated according to the engine speed, and a disturbance compensation value for compensating for a disturbance received by the variable cam phase mechanism is calculated based on the correction value with a predetermined estimation algorithm, and the control value is further calculated based on the calculated disturbance estimated value. In the case where the control value is calculated further based on the disturbance estimated value, as described above, if the disturbance estimated value is calculated independently of the correction value, there arises the following problem: When the range of variation in the engine speed increases to increase the absolute value of the correction value, which causes the cam phase to undergo an oscillating behavior, overshooting, or an error, these are regarded to be caused by disturbance, and the disturbance estimated value is calculated in a manner compensating therefor. As a result, when the range of variation in the engine speed decreases, the control value calculated based on such a disturbance estimated value can be an improper one. In the cam phase control system according to the preferred embodiment, however, the disturbance estimated value is calculated based on the correction value, even when the correction value is varied with a variation in the engine speed, it is possible to properly calculate the disturbance estimated value while taking such a variation in the control value into account, whereby the control value can be calculated as a value which can properly compensate for the disturbance received by the variable cam phase mechanism. As a result, it is possible to even further improve the controllability and control accuracy of the cam phase control.

The above and other objects, features, and advantages of the invention will become more apparent from the following detailed description taken in conjunction with the accompanying drawings wherein like reference characters in the various figures are used to designate like components.

DETAILED DESCRIPTION OF PREFERRED EMBODIMENTS

Figure 1:
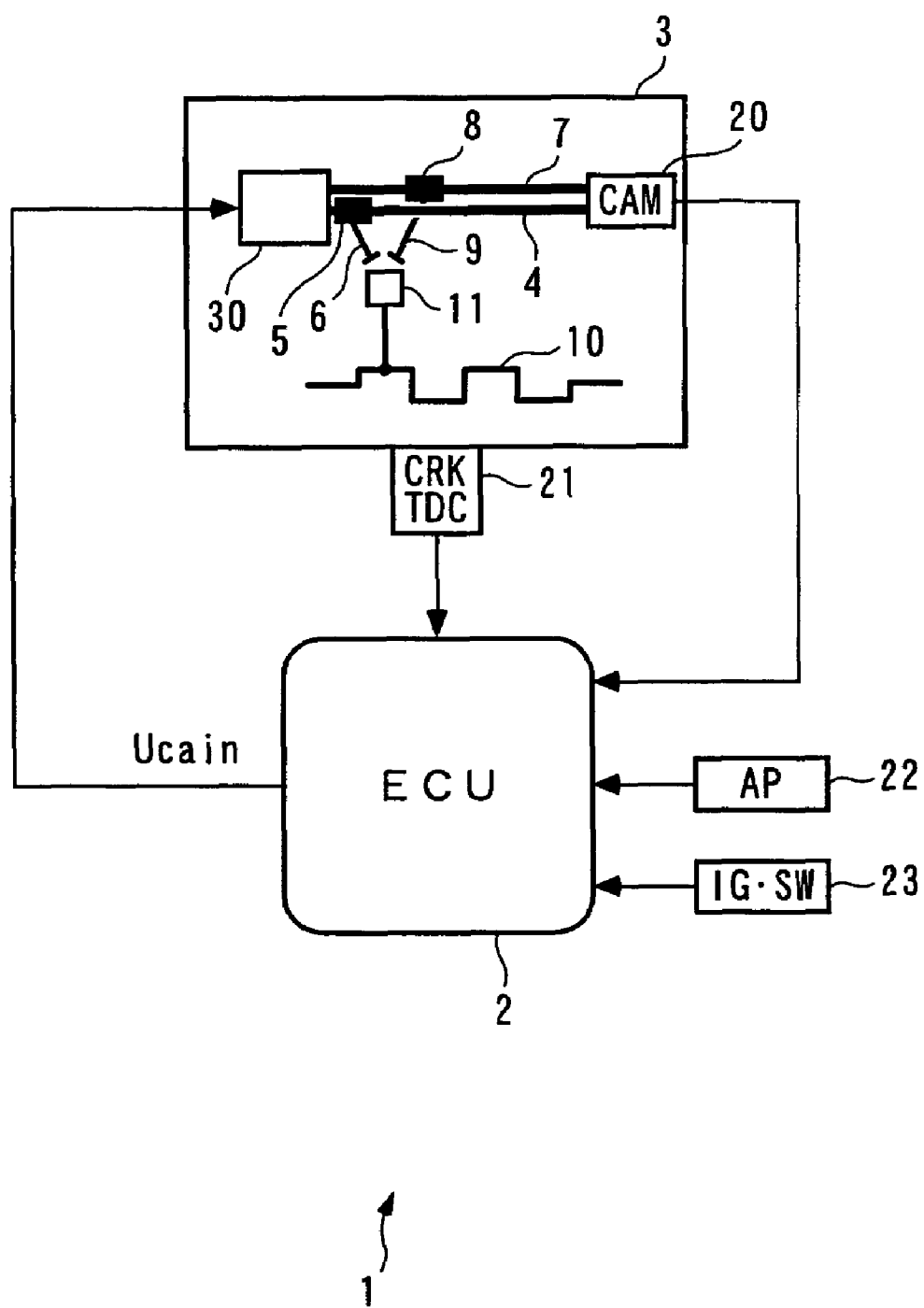
FIG. 1 is a schematic diagram of a cam phase control system according to a first embodiment of the present invention and an internal combustion engine to which the cam phase control system is applied.

The invention will now be described in detail with reference to the drawings showing preferred embodiments thereof. FIG. 1 shows a cam phase control system according to a first embodiment of the present invention, which controls the phase of an intake cam 5, i.e. the phase of an intake camshaft 4, relative to a crankshaft 10 of an internal combustion engine (hereinafter simply referred to as "the engine") 3, and is comprised of a variable cam phase mechanism 30 that varies the cam phase Cain, and an ECU 2 that controls the variable cam phase mechanism 30, as shown in FIG. 1. The ECU 2 executes a cam phase control process, as will be described in detail hereinafter.

The engine 3 is of a four-cycle DOHC type and includes the intake camshaft 4 and an exhaust camshaft 7. The intake and exhaust camshafts 4 and 7 have intake cams 4 and exhaust cams 8 provided thereon, for respective cylinders, for opening and closing the intake valves 6 and exhaust valves 9.

Figure 2:
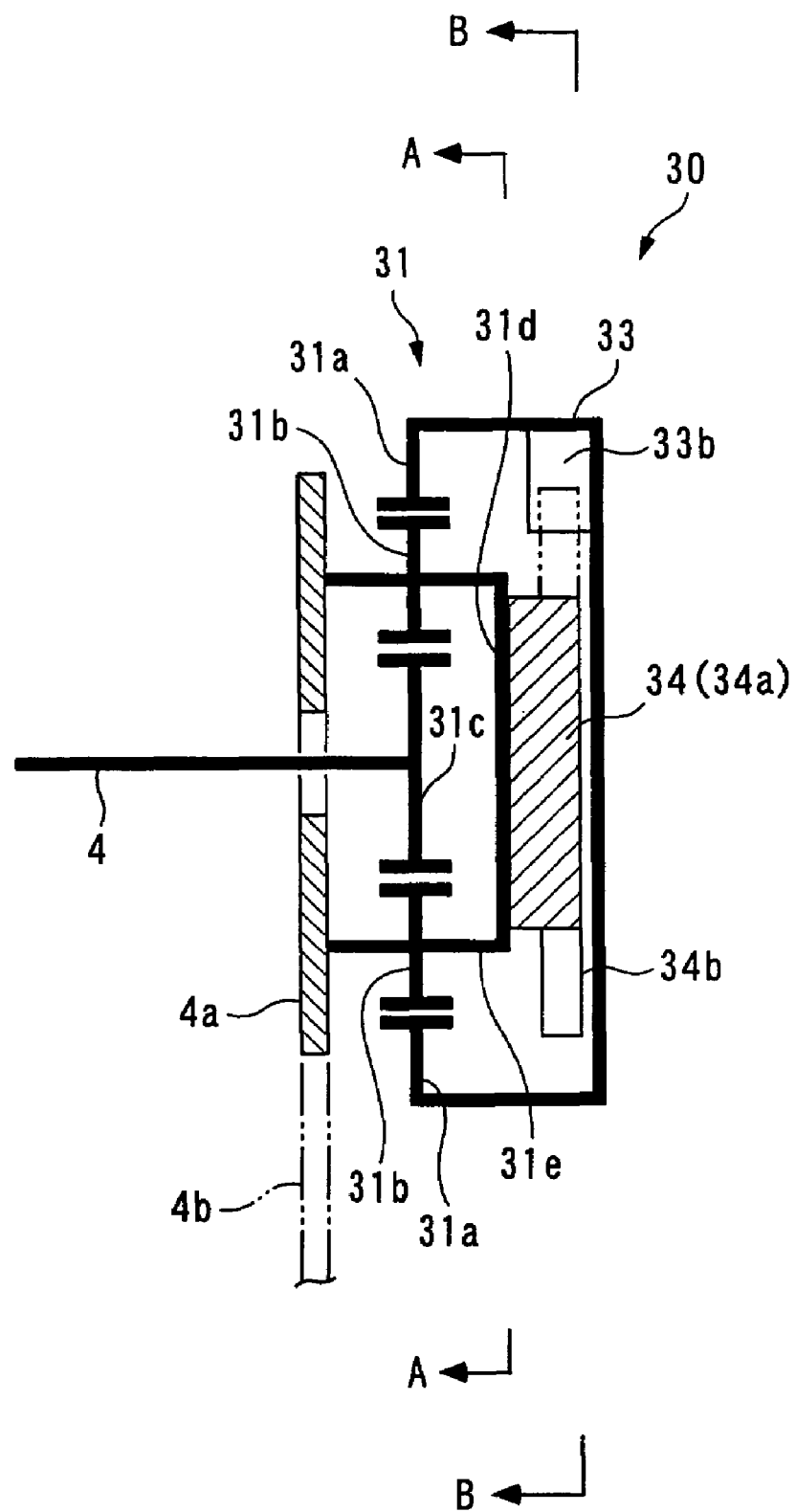
FIG. 2 is a schematic cross-sectional view of a variable cam phase mechanism.

A sprocket 4a is coaxially fitted on the intake camshaft 4, for rotation, as shown in FIG. 2. The sprocket 4a is connected to the crankshaft 10 via a timing chain 4b, and further connected to the intake camshaft 4 via a planetary gear unit 31, referred to hereinafter, of the variable cam phase mechanism 30. With this arrangement, the intake camshaft 4 performs one rotation per two rotations of the crankshaft 10. Also, the exhaust camshaft 7 is provided with a sprocket (not shown) integrally formed therewith, and connected to the crankshaft 10 via the sprocket and a timing chain, not shown, whereby the exhaust camshaft 7 performs one rotation per two rotations of the crankshaft 10.

Figure 3:
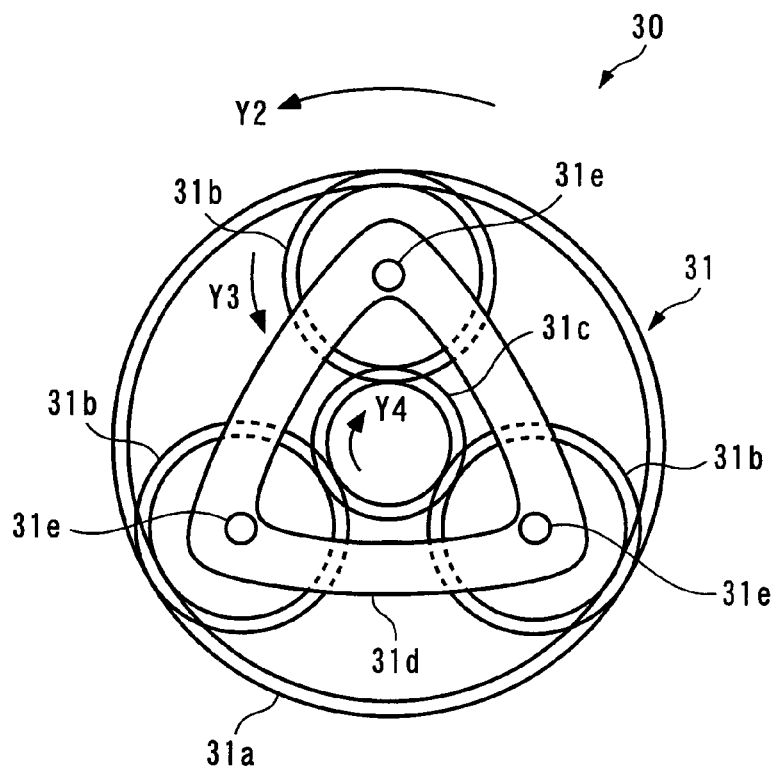
FIG. 3 is a schematic view taken on line A-A of FIG. 2, which shows a planetary gear unit.
Figure 4:
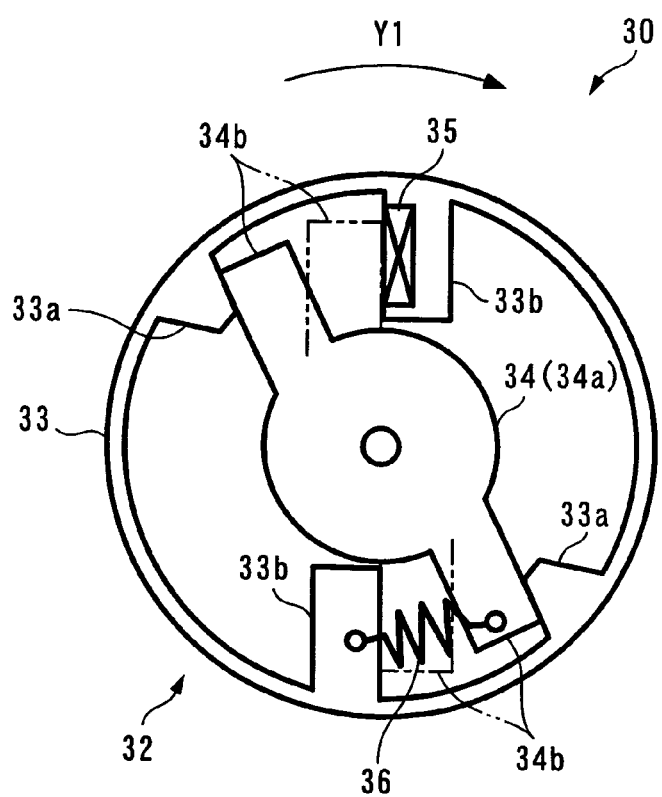
FIG. 4 is a schematic view taken on line B-B of FIG. 2, which shows an electromagnetic brake.

The variable cam phase mechanism 30 is of an electromagnetic type which steplessly varies the cam phase Cain by an electromagnetic force, as described hereinafter, and is comprised of the planetary gear unit 31 and an electromagnetic brake 32, as shown in FIGS. 2 to 4.

The planetary gear unit 31 transmits rotation between the intake camshaft 4 and the sprocket 4a, and is comprised of a ring gear 31a, three planetary pinion gears 31b, a sun gear 31c, and a planetary carrier 31d. The ring gear 31a is connected to an outer casing 33, referred to hereinafter, of the electromagnetic brake 32, and rotated coaxially in unison with the outer casing 33. Further, the sun gear 31c is coaxially attached to a foremost end of the intake camshaft 4 for rotation in unison therewith.

On the other hand, the planetary carrier 31d has a generally triangular shape, and includes shafts 31e protruding from the three corners thereof. The planetary carrier 31d is connected to the sprocket 4a via these shafts 31e, such that it rotates coaxially in unison with the sprocket 4a.

Further, each planetary pinion gear 31b is rotatably supported on an associated one of the shafts 31e of the planetary carrier 31d, and is disposed between the sung gear 31c and the ring gear 31a, in constant mesh with these gears.

Further, the electromagnetic brake 32, referred to hereinbefore, is comprised of an outer casing 33, a core 34, an electromagnet 35, and a return spring 36. The outer casing 33 is formed to be hollow, and the core 34 is disposed therein in a manner rotatable relative to the outer casing 33. The core 34 is comprised of a root portion 34a circular in cross-section, and two arms 34b and 34b extending radially from the root portion 34a. The core 34 has its root portion 34a mounted on the planetary carrier 31d for coaxial rotation in unison with the planetary carrier 31d.

On the other hand, on the inner peripheral surface of the outer casing 33, there are provided two pairs of stoppers 33a and 33b, at spaced intervals, each pair formed by a stopper 3a defining the most retarded position and a stopper 33b defining the most advanced position. The arms 34b of the core 34 are disposed between the respective pairs of stoppers 33a and 33b, whereby the core 34 is rotatable relative to the outer casing 33 between the most retarded position (indicated by solid lines in FIG. 4) in which the arms 34b are brought into contact with the most retarded position stoppers 33a and stopped thereat, and the most advanced position (indicated by two-dot-chain lines in FIG. 4) in which the arms 34b are brought into contact with the most advanced position stoppers 33b and stopped thereat.

Further, the return spring 36 is interposed in a compressed state between one of the most advanced position stoppers 33b and the opposed one of the arms 34b, and the urging force Fspr (second force) of the return spring 36 urges the arms 34b toward the most retarded position stoppers 33a.

On the other hand, the electromagnet 35 is attached to one of the most advanced position stoppers 33b on a side opposite to the return spring 36, such that it is flush with an end of the most advanced position stopper 33b opposed to the arm 34b. The electromagnet 35 is electrically connected to the ECU 2, and when energized by the control input Ucain (voltage signal) from the ECU 2, the electromagnetic force Fsol (first force) attracts the opposed one of the arms 34b against the urging force of the return spring 36 to pivotally move the same toward the most advanced position stopper 33b.

A description will be given of the operation of the variable cam phase mechanism 30 constructed as described above. In the variable cam phase mechanism 30, when the electromagnet 35 of the electromagnetic brake 32 is not energized, the core 34 is held by the urging force Fspr of the return spring 36 at the most retarded position in which the arm 34b abuts the most retarded position stopper 33a, whereby the cam phase Cain is held at the most retarded value Cainrt (see FIG. 5).

In this state, as the sprocket 4a rotates in a direction indicated by an arrow Y1 in FIG. 4 along with rotation of the crankshaft 10 of the engine in operation, the planetary carrier 31d and the ring gear 31a rotate in unison therewith, whereby the planetary pinion gears 31b are inhibited from rotation but the sun gear 31c rotates in unison with the planetary carrier 31d and the ring gear 31a. That is, the sprocket 4a and the intake camshaft 4 rotate in unison with each in the direction indicated by the arrow Y1.

Further, in a state in which the core 34 is held at the most retarded position, if the electromagnet 35 is energized by the control input Ucain from the ECU 2, the electromagnetic force Fsol of the electromagnet 35 attracts the arm 34b of the core 34 toward the most advanced position stopper 33b, i.e. toward the most advanced position, against the urging force Fspr of the return spring 36, to be rotated to a position where the electromagnetic force Fsol and the urging force Fspr are balanced with each other. In other words, the outer casing 33 rotates relative to the core 34 in a direction opposite to the direction indicated by the arrow Y1.

This causes the ring gear 31a to rotate relative to the planetary carrier 31d in a direction indicated by an arrow Y2 in FIG. 3, and along therewith, the planetary pinion gears 31b rotate in a direction indicated by an arrow Y3 in FIG. 3, whereby the sun gear 31c rotates in a direction indicated by an arrow Y4 in FIG. 3. As a result, the intake camshaft 4 rotates relative to the sprocket 4a in the direction of the rotation of the sprocket 4a (i.e. a direction opposite to the direction indicated by the arrow Y2 in FIG. 3), whereby the cam phase Cain is advanced.

In this case, the pivotal motion of the outer casing 33 is transmitted to the intake camshaft 4 via the ring gear 31a, the planetary pinion gears 31b, and the sun gear 31c, and therefore the speed-increasing action of the planetary gear unit 30 causes the intake camshaft 4 to rotate relative to the sprocket 4a by an amplified or increased amount of angle of rotation of the outer casing 33. That is, the amount of advance of the cam phase Cain of the intake cam 5 is configured to be equal to an amplified value of angle of rotation of the outer casing 33. This is because the electromagnetic force Fsol of the electromagnet 35 has a limit beyond which it is not effective, and hence it is necessary to cause the cam phase Cain to vary through a wider range by compensating for the limit.

As described above, in the variable cam phase mechanism 30, the electromagnetic force Fsol acts in the direction of advancing the cam phase Cain, and the urging force Fspr of the return spring 36 acts in the direction of retarding the cam phase Cain. Further, when the electromagnetic force Fsol does not vary, the cam phase Cain is held at a value in which the electromagnetic force Fsol and the urging force Fspr are balanced.

Figure 5:
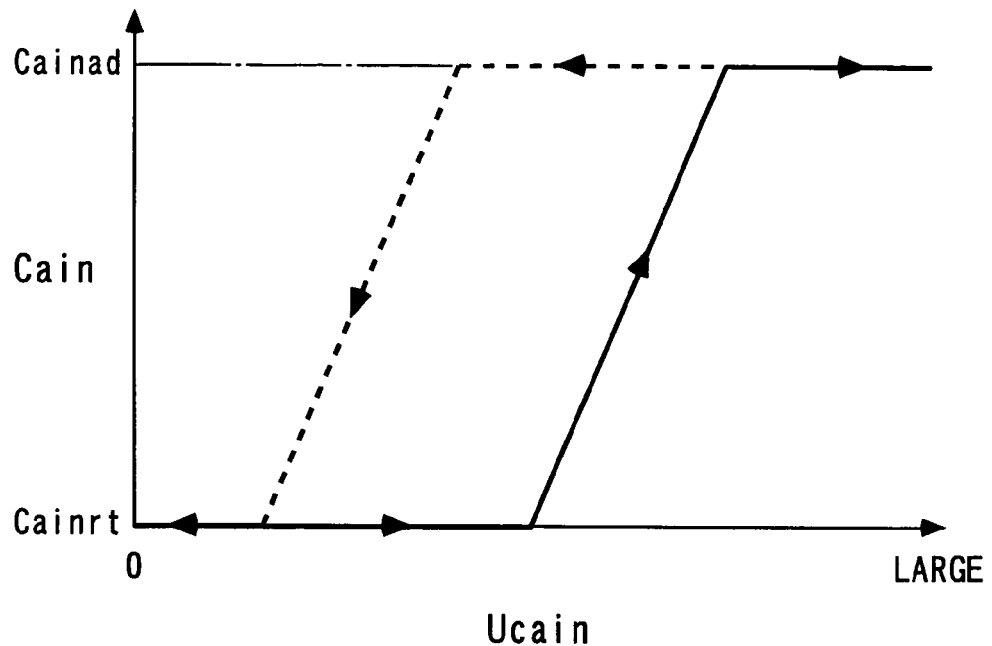
FIG. 5 is a graph showing a characteristic curve representative of operating characteristics of the variable cam phase mechanism.

Next, a description will be given of the operating characteristics of the variable cam phase mechanism 30. As shown in FIG. 5, in the variable cam phase mechanism 30, the cam phase Cain is continuously varied by the control input Ucain to the electromagnet 35 between the most retarded value Cainrt (e.g. a cam angle of 0°) and the most advanced value Cainad (e.g. a cam angle of 55°), and a solid curve indicative of values of the cam phase Cain assumed when the control input Ucain is increasing, and a broken line indicative of values of the cam phase assumed when the control input Ucain is decreasing are different from each other, i.e. the cam phase Cain exhibits a hysteresis characteristic.

Figure 6:
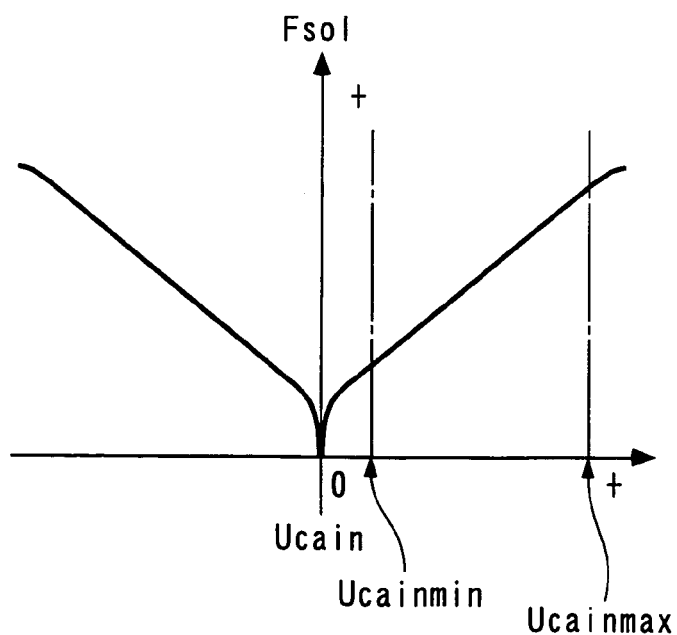
FIG. 6 is a graph showing a characteristic curve representative of operating characteristics of an electromagnet of the variable cam phase mechanism.

This is due to the fact that the electromagnet 35 has the characteristic that the electromagnetic force Fsol generated by the electromagnet 35 is slow in rising when the electromagnet 35 is energized by the control input Ucain at the start of operation thereof, as shown in FIG. 6. Further, as also shown in FIG. 6, the electromagnetic force Fsol of the electromagnet 35 has a characteristic of exhibiting the same tendency between when the control input Ucain is increased from a value of 0 to a positive side and when it is decreased from a value of 0 to a negative side. In short, it has a characteristic of exhibiting a symmetric tendency with respect to a center in which the control input Ucan has a value of 0. Therefore, when the control input Ucain is set such that a value thereof is inverted with respect to a value of 0 as the center, the electromagnetic force Fsol is canceled out.

Since the variable cam phase mechanism 30 has the above-described characteristic, in the present embodiment, during a steady operation of the engine in which the engine speed NE is stable, the control input Ucain is calculated as a positive value which repeatedly increases and decreases in a manner inverted between a predetermined maximum value Ucainmax (see FIG. 6) and a predetermined minimum value Ucainmin (see FIG. 6), both of which are positive values. The minimum value Ucainmin is set to a value outside a range in which the electromagnetic force Fsol is slow in rising at the start of operation of the electromagnet 35, whereby the electromagnetic force Fsol is controlled by the control input Ucain such that it is substantially linearly varied in a range outside the range in which the electromagnetic force Fsol is slow in rising at the start of operation of the electromagnet 35. As a result, the cam phase Cain is controlled to be linearly varied between the most retarded value Cainrt and the most advanced value Cainad without exhibiting the hysteresis characteristic with respect to the control input Ucain (see a curve of a solid line in FIG. 11, referred to hereinafter).

The reason for using, in the present embodiment, the variable cam phase mechanism 30 described above in place of the conventional hydraulic variable cam phase mechanism is as follows: The conventional hydraulic variable cam phase mechanism has characteristics that it takes time before an oil pressure pump is started, and the hydraulic pressure is thereby sufficiently increased to make the cam phase Cain controllable; the response of the mechanism is degraded when the oil temperature is very low; dead time is long; and responsiveness is low. In contrast, the variable cam phase mechanism 30 used in the present embodiment is advantageous in that it is neither required to wait for the hydraulic pressure to rise nor affected by oil temperature, but is capable of properly controlling the cam phase Cain from the start thereof, and further is short in dead time and ensures higher responsiveness. The variable cam phase mechanism 30 is used to make use of these advantages.

On the other hand, a cam angle sensor 20 is disposed at an end of the intake camshaft 4 opposite to the variable cam phase mechanism 30. The cam angle sensor 20 (cam phase-detecting means) is formed e.g. by a magnet rotor and an MRE pickup, and delivers a CAM signal, which is a pulse signal, to the ECU 2 along with rotation of the intake camshaft 4. Each pulse of the CAM signal is generated whenever the intake camshaft 4 rotates through a predetermined cam angle (e.g. 1°).

The engine 3 is provided with a crank angle sensor 21. The crank angle sensor 21 is e.g. comprised of a magnet rotor and an MRE (magnetic resistance element) pickup, similarly to the cam angle sensor 20, and delivers a CRK signal and a TDC signal, which are both pulse signals, to the ECU 2 in accordance with rotation of the crankshaft 10.

Each pulse of the CRK signal is generated whenever the crankshaft 10 rotates through a predetermined angle (e.g. 30°). The ECU 2 determines the rotational speed NE of the engine 3 (hereinafter referred to as "the engine speed NE") based on the CRK signal, and calculates the cam phase Cain based on the CRK signal and the CAM signal from the cam angle sensor 20. Further, the TDC signal indicates that each piston 11 in the associated cylinder is in a predetermined crank angle position slightly before the TDC position at the start of the intake stroke, and each pulse of the TDC signal is generated whenever the crankshaft 10 rotates through a predetermined crank angle. In the present embodiment, the crank angle sensor 21 corresponds to engine speed-detecting means, and cam phase-detecting means.

Furthermore, connected to the ECU 2 are an accelerator pedal opening sensor 22, and an ignition switch (hereinafter referred to as "the IG·SW") 23. The accelerator pedal opening sensor 22 detects an opening or stepped-on amount of an accelerator pedal, not shown, (hereinafter referred to as "the accelerator pedal opening AP") and delivers a signal indicative of the detected accelerator pedal opening AP to the ECU 2. Further, the IG·SW 23 is turned on or off by operation of an ignition key, not shown, and delivers a signal indicative of the ON/OFF state thereof to the ECU 2.

The ECU 2 is implemented by a microcomputer including an I/O interface, a CPU, a RAM and a ROM. The ECU 2 determines operating conditions of the engine 3, based on the detection signals delivered from the above-mentioned sensors 20 to 22, the ON/OFF signal from the IG·SW 23, etc. and executes a cam phase control process, as described hereinafter.

It should be noted that in the present embodiment, the ECU 2 corresponds to engine speed-detecting means, cam phase-detecting means, target cam phase-setting means, control value-calculating means, control input-calculating means, identification means, and disturbance estimated value-calculating means.

Figure 7:
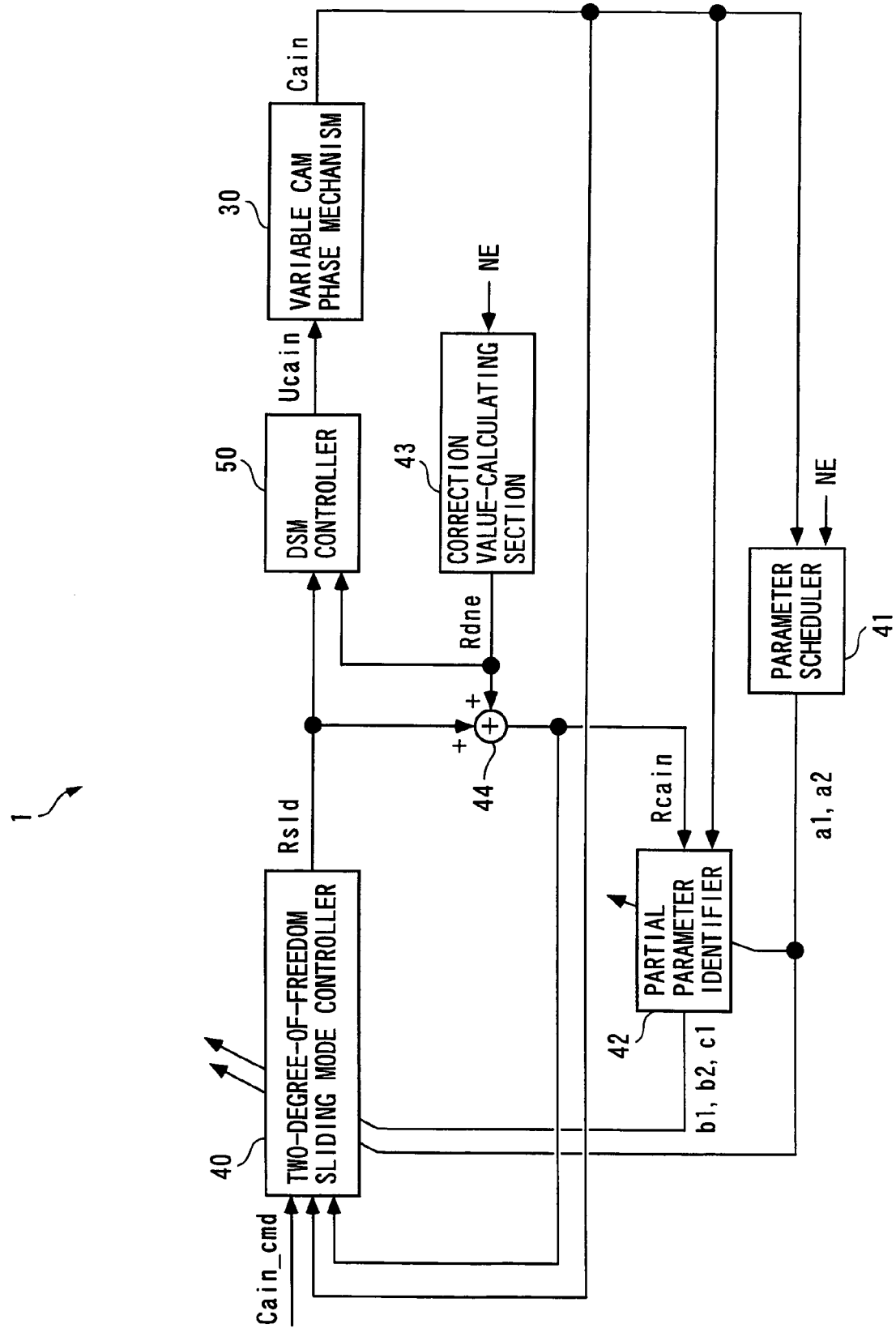
FIG. 7 is a schematic block diagram of the cam phase control system according to the first embodiment.

Now, a description will be given of the cam phase control system 1 according to the resent embodiment. As shown in FIG. 7, the cam phase control system 1 is comprised of a two-degree-of-freedom sliding mode controller (hereinafter referred to as "two-degree-of-freedom SLD controller") 40, a parameter scheduler 41, a partial parameter identifier 42, a correction value-calculating section 43, an addition element 44, and a DSM controller 50, all of which are implemented by the ECU 2.

In the cam phase control system 1, the control input Ucain is calculated, and the control input Ucain is input to the variable cam phase mechanism 30, whereby the cam phase Cain is controlled such that it becomes equal to a target cam phase Cain_cmd, as described hereinafter. The target cam phase Cain_cmd is calculated depending on operating conditions of the engine 3, as described hereinafter.

First, the two-degree-of-freedom SLD controller 40 calculates an SLD control input Rsld with a control algorithm, referred to hereinafter, based on the target cam phase Cain_cmd, the cam phase Cain, and so forth. In the present embodiment, the two-degree-of-freedom SLD controller 40 corresponds to the control value-calculating means, and the SLD control input Rsld corresponds to a follow-up control value.

The parameter scheduler 41 calculates model parameters a1 and a2 of a controlled system model, referred to hereinafter, and further, the partial parameter identifier 42 calculates model parameters b1 and b2 of the controlled system model and a disturbance estimated value c1, with an identification algorithm, referred to hereinafter. These model parameters a1, a2, b1, and b2, and the disturbance estimated value c1 are used by the two-degree-of-freedom SLD controller 40 for calculation of the SLD control input Rsld. In the present embodiment, the partial parameter identifier 42 corresponds to the disturbance estimated value-calculating means and the identification means.

Further, the correction value-calculating section 43 (control input-calculating means) calculates, as described hereinafter, the correction value Rdne based on the engine speed NE, and the addition element 44 calculates an imaginary control input Rcain as the sum of the SLD control input Rsld and the correction value Rdne. The imaginary control input Rcain is used by the partial parameter identifier 42 for calculation of the model parameters b1 and b2 and the disturbance estimated value c1.

Further, the DSM controller 50 calculates the control input Ucain with a control algorithm, referred to hereinafter, based on the SLD control input Rsld and the correction value Rdne. In the present embodiment, the DSM controller 50 corresponds to the control value-calculating means and the control input-calculating means.

Next, a description will be given of the two-degree-of-freedom SLD controller 40. With a target value filter-type two-degree-of-freedom sliding mode control algorithm defined by the following equations (1) to (6), the two-degree-of-freedom SLD controller 40 calculates the SLD control input Rsld as a value for causing the cam phase Cain to follow up the target cam phase Cain_cmd. It should be noted that the SLD control input Rsld is calculated as a positive value for the reason described hereinafter. In the following equations (1) to (6), each discrete data with a symbol (k) represents data sampled (or calculated) in synchronism with a predetermined cycle. The symbol k represents a position in the sequence of sampling cycles of discrete data. For example, the symbol k indicates that discrete data therewith is a value sampled in the current control timing, and a symbol k−1 indicates that discrete data therewith is a value sampled in the immediately preceding control timing. This also applies to the following discrete data. It should be noted that in the following description, the symbol k and the like provided for the discrete data are omitted as deemed appropriate.

$$Cain\_cmd\_f(k) = \qquad (1)$$
$$-POLE\_f \cdot Cain\_cmd\_f(k-1) + (1 + POLE\_f) \cdot Cain\_cmd(k)$$

$$Rsld(k) = Req(k) + Rrch(k) \qquad (2)$$

$$Req(k) = \qquad (3)$$
$$\frac{1}{b1(k)}\{(1 - POLE - a1(k)) \cdot Cain(k) + (POLE - a2(k)) \cdot Cain(k-1) -$$
$$b2(k) \cdot Rcain(k-1) - c1(k) + Cain\_cmd\_f(k) +$$
$$(POLE - 1) \cdot Cain\_cmd\_f(k-1) -$$
$$POLE \cdot Cain\_cmd\_f(k-2)\}$$

$$Rrch(k) = -\frac{Krch}{b1(k)} \cdot \sigma s(k) \qquad (4)$$

$$\sigma s(k) = Ecain(k) + POLE \cdot Ecain(k-1) \qquad (5)$$

$$Ecain(k) = Cain(k) - Cain\_cmd\_f(k) \qquad (6)$$

In the control algorithm, first, a filtered value Cain_cmd_f of a target cam phase is calculated with a first-order lag filter algorithm expressed by the equation (1). In the equation (1), POLE_f represents a target value filter-setting parameter set to a value which satisfies the relationship of −1<POLE_f<0.

Next, the SLD control input Rsld is calculated with a sliding mode control algorithm expressed by the equations (2) to (6). That is, as shown in the equation (2), the SLD control input Rsld is calculated as the sum of an equivalent control input Req and a reaching law input Rrch.

The equivalent control input Req is calculated using the equation (3). In the equation (3), parameters a1, a2, b1, and b2 represent model parameters of the controlled system model expressed by the equation (7), referred to hereinafter, and c1 represents the disturbance estimated value for compensating for disturbance and a modeling error. The model parameters a1 and a2 are calculated by the parameter scheduler 41, and the model parameters b1 and b2 and the disturbance estimated value c1 are calculated (identified) by the partial parameter identifier 42. Further, In the equation (3), POLE represents a switching function-setting parameter set to a value which satisfies the relationship of −1<POLE_f<POLE<0.

On the other hand, the reaching law input Rrch is calculated using an equation (4). In the equation (4), Krch represents a predetermined reaching law gain, and as represents a switching function defined by the equation (5). Ecain in the equation (5) represents a follow-up error calculated by the equation (6).

The above equations (2) to (6) are derived as follows: First, a controlled system is defined as a system to which is inputted the imaginary control input Rcain (=Rsld+Rdne) and from which is outputted the cam phase Cain, and modeled into a discrete-time system model, whereby the following equation (7) is obtained. Since the imaginary control input Rcain is calculated, as mentioned above, as the sum of the SLD control input Rsld and the correction value Rdne, the above equation (7) corresponds to a definition of a relation in dynamic characteristics between the SLD control input Rsld, the correction value Rdne, and the cam phase Cain.

$$Cain(k+1) = \qquad (7)$$
$$a1 \cdot Cain(k) + a2 \cdot Cain(k-1) + b1 \cdot Rcain(k) + b2 \cdot Rcain(k-1) + c1$$

Then, a model is contemplated in which the model parameters a1, a2, b1, and b2, and the disturbance estimated value c1 in the equation (7) are substituted by calculated (identified) values calculated by the parameter scheduler 41 and the partial parameter identifier 42, and when the target value filter-type two-degree-of-freedom sliding mode control theory is applied to the model such that the cam phase Cain follows up the target cam phase Cain_cmd, the aforementioned equations (1) to (6) are derived.

The control algorithm of the two-degree-of-freedom SLD controller 40 enables the cam phase Cain to excellently follow up the target cam phase Cain_cmd, with an excellent follow-up behavior, and a high disturbance-suppressing capability. That is, in the filtering algorithm expressed by the equation (1), by setting the target value filter-setting parameter POLE_f to a target value within the range of −1<POLE<0, it is possible to designate the follow-up capability as desired. Further, with the sliding mode control algorithm expressed by the equations (2) to (6), influence of the modeling error and disturbance can be suppressed by the disturbance estimated value c1, and the follow-up behavior and the disturbance suppressing capability can be designated as desired by setting the switching function parameter POLE to a target value within the range of −1<POLE<0.

Figure 8:
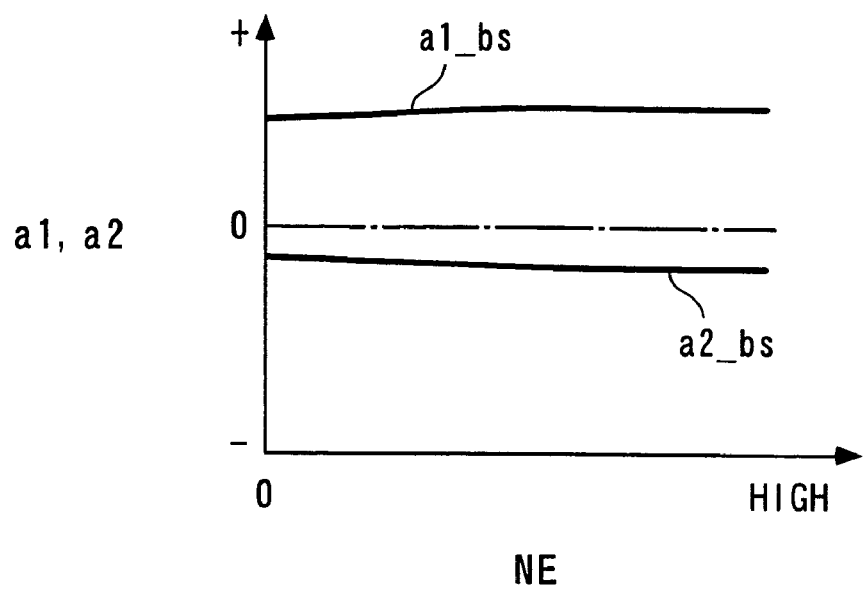
FIG. 8 is a diagram showing an example of a table for use in calculating basic values a1_bs and a2_bs of model parameters.

Next, a description will be given of the above-mentioned parameter scheduler 41. The parameter scheduler 41 calculates the model parameters a1 and a2 as follows: First, the basic values a1_bs and a2_bs of the model parameters a1 and a2 are calculated by searching a table shown in FIG. 8 according to the engine speed NE. In the table, the basic value a1_bs is set to a larger value as the engine speed NE is higher, and on the other hand, the basic value a2_bs is set to a smaller value as the engine speed NE is higher. This is because as the engine speed NE is higher, periodical behaviors occur in the timing chain 4b other than that caused by the engine speed NE, which degrades the stability of the behavior of the cam phase Cain, resulting in a change in the dynamic characteristics of the model. The table is configured as described above so as to adapt the model to such a change in the dynamic characteristics.

Figure 9:
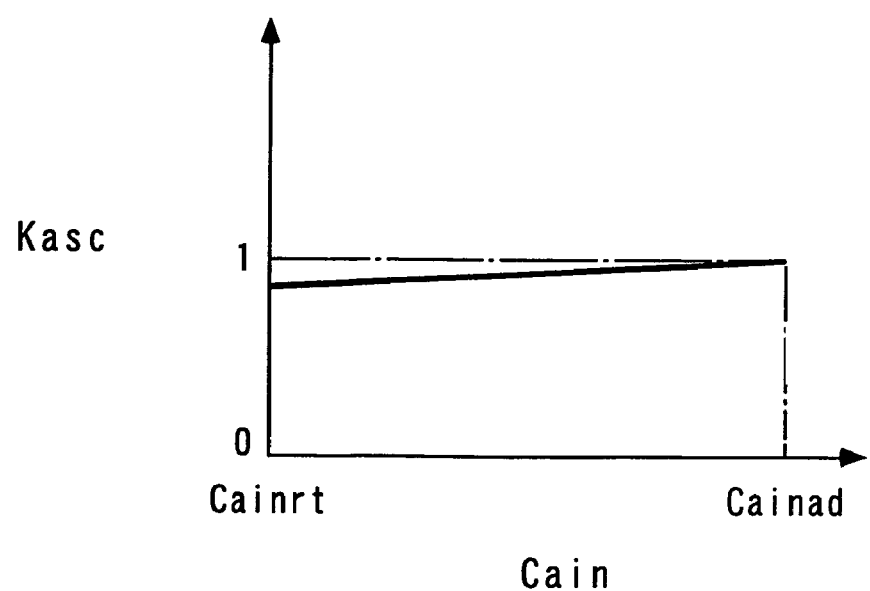
FIG. 9 is a diagram showing an example of a table for use in calculating a correction coefficient Kasc.

Further, The parameter scheduler 41 calculates the correction coefficient Kasc by searching a table shown in FIG. 9. In the table, the correction coefficient Kasc is set to a larger value as the cam phase Cain is toward the most advanced value Cainad. Assuming that the cam phase Cain is advanced, the valve overlap, i.e. the internal EGR amount, increases, which increases combustion variation, and the increased combustion variation is transmitted to the variable cam phase mechanism 30 via the timing chain 4b, causing the degradation of the behavior of the cam phase Cain. The table in FIG. 9 is configured as above so as to compensate for this inconvenience.

Next, using the basic value a1_bs and a2_bs and the correction coefficient Kasc calculated as described above, the model parameters a1 and a2 are calculated by the following equations (8) and (9):

$$a1 = a1\_bs \cdot Kasc \qquad (8)$$

$$a2 = a2\_bs \cdot Kasc \qquad (9)$$

Next, a description will be given of the partial parameter identifier 42 mentioned above. The partial parameter identifier 42 identifies a vector θ of the model parameters b1 and b2 and the disturbance estimated value c1, with a sequential identification algorithm expressed by the following equations (10) to (17). That is, the partial parameter identifier 42 is constructed as an onboard identifier.

$$\theta(k) = \theta(k-1) + KP(k) \cdot E\_id(k) \qquad (10)$$

$$\theta^T(k) = [b1(k), b2(k), c1(k)] \qquad (11)$$

$$E\_id(k) = W(k) - W\_hat(k) \qquad (12)$$

$$W(k) = Cain(k) - a1(k) \cdot Cain(k-1) - a2(k) \cdot Cain(k-2) \qquad (13)$$

$$W\_hat(k) = \theta^T(k) \cdot \zeta(k) \qquad (14)$$
$$= b1(k) \cdot Rcain(k-1) + b2(k) \cdot Rcain(k-2) + c1(k)$$

$$\zeta^T(k) = [Rcain(k-1), Rcain(k-2), 1] \qquad (15)$$

$$KP(k) = \frac{P(k) \cdot \zeta(k)}{1 + \zeta^T(k) \cdot P(k) \cdot \zeta(k)} \qquad (16)$$

$$P(k+1) = \frac{1}{\lambda 1}\left\{I - \frac{\lambda 2 \cdot P(k) \cdot \zeta(k) \cdot \zeta^T(k)}{\lambda 1 + \lambda 2 \cdot \zeta^T(k) \cdot P(k) \cdot \zeta(k)}\right\} \cdot P(k) \qquad (17)$$

The vector θ in the equation (10) has a transposed matrix as defined by the equation (11), and KP in the equation (10) represents a vector of a gain coefficient, while E_id a follow-up error. The follow-up error E_id is calculated by the equations (12) to (15). W in the equation (12) represents an imaginary output as defined by the equation (13), and W_hat in the same represents an identified value of the imaginary output as defined by the equation (14). ζ(k) in the equation (14) represents a vector whose transposed matrix is defined by the equation (15). Further, a vector KP of the gain coefficient is calculated by the equation (16), and P in the equation (16) is a third-order square matrix as defined by the equation (17). Further, I in the equation (17) represents a third-order unit matrix, and λ1 and λ2 in the same weighting parameters.

With-the above-described identification algorithm, by configuration of the weighting parameters λ1 and λ2 of the equation (17), there is selected one of the following four identification algorithms:

λ1=1, λ2=0: fixed gain algorithm
λ1=1, λ2=1: least-squares method algorithm
λ1=1, λ2=λ: progressive reduction gain algorithm
λ1=λ, λ2=1: weighted least-squares method algorithm
provided that λ represents a predetermined value which is set such that 0<X<1 holds.

In the present embodiment, the partial parameter identifier 42 employs the weighted least-squares method algorithm so as to optimally ensure the identification accuracy and the follow-up speed of the vector θ to the optimum value.

The algorithms of the above equations (10) to (17) are derived as follows: In the model expressed by the aforementioned equation (7), each variable is shifted by one discrete time, and the model parameters a1, a2, b1, and b2 and the disturbance estimated value c1 are replaced by the calculated values and the identified values thereof. Then, the term of Cain is transposed to the left side, whereby there is obtained the following equation (18):

$$Cain(k)-a1(k)\cdot Cain(k-1)-a2(k)\cdot Cain(k-2)=b1(k)\cdot Rcain(k-1)+b2(k)\cdot Rcain(k-2)+c1(k) \quad (18)$$

In this equation (18), when the left side is defined as W, and the right side as W_hat, there are obtained the above equations (13) and (14). Here, regarding W as the output of an imaginary controlled system, and W_hat as the identified value of the output of the controlled system, the equation (14) can be regarded as a model of the imaginary controlled system. Therefore, when the sequential identification algorithm is applied to identify the model parameters of the imaginary controlled system such that the imaginary output W approaches the identified value W_hat, the above equations (10) to (17) are derived.

Next, a description will be given of the correction value-calculating section 43 mentioned above. The correction value-calculating section 43 calculates the correction value Rdne by searching a table shown in FIG. 10 according to an engine speed change amount DNE. The engine speed change amount DNE is calculated as the difference [NE(k)−NE(k−1)] between the current value and the immediately preceding value of the engine speed NE. Further, in FIG. 10, DNE1 represents a positive predetermined value.

In this table, the correction value Rdne is set to a value of 0 Within a range of −DNE1≦DNE≦DNE1, whereas in a range of DNE1<DNE, it is set to a negative value and the absolute value thereof is set to a larger value as the engine speed change amount DNE is larger. Further, within a range of DNE<−DNE1, the correction value Rdne is set to a positive value and is set to a larger value as the engine speed change amount DNE is larger.

The correction value Rdne is set as described above for the following reason: In the present embodiment, the variable cam phase mechanism 30 is configured, as described hereinbefore, such that the sprocket 4a is connected to the crankshaft 10 via the timing chain 4b, and rotates in unison with the core 34 of the electromagnetic brake 32, and hence when the engine speed NE suddenly increases from a stable steady operating condition, the inertial force of the timing chain 4b, the crankshaft 10, and so forth suddenly increases. This causes the core 34 of the electromagnetic brake 32 to rotate relative to the outer casing 33 in the direction indicated by the arrow Y1 in FIG. 4 while compressing the return spring 36. That is, when the engine speed NE suddenly increases, the inertial force suddenly increased thereby acts to advance the cam phase Cain, and hence the control input Ucain required for advancing the cam phase Cain becomes smaller than when the engine is in the steady operation.

Figure 11:
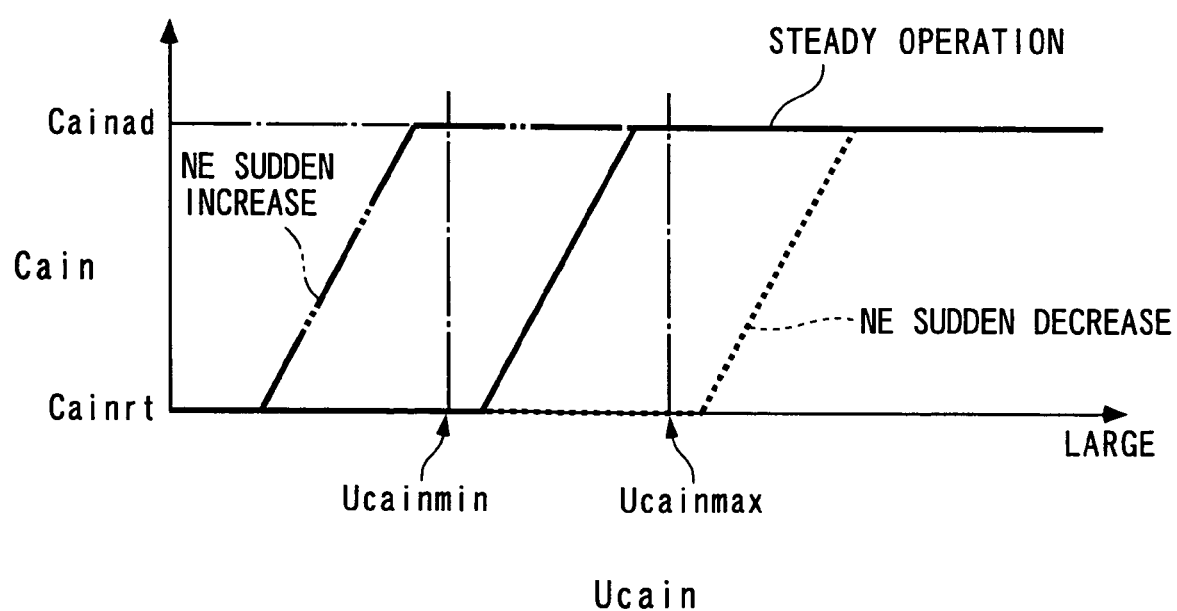
FIG. 11 is a graph showing a characteristic curve useful in explaining influence of an inertial force acting on the variable cam phase mechanism when the engine speed suddenly changes.

As a result, as shown in FIG. 11, a characteristic curve of the cam phase Cain (indicated by a two-dot-chain line) exhibited when the engine speed NE suddenly increases deviates toward the smaller value side of the control input Ucain with respect to a characteristic curve (indicated by a solid line) exhibited when the engine is in the steady operation. If the control input Ucain is calculated as a value which repeatedly increases and decreases in a manner inverted between the maximum value Ucainmax and the minimum value Ucainmin, the cam phase Cain is held at the most advanced value Cainad. Therefore, to compensate for influence of the suddenly increased inertial force and avoid the state of the cam phase Cain being held at the most advanced value Cainad, the control input Ucain is only required to be corrected to a smaller value depending on the degree of increase of the inertial force.

In this case, as will be described hereinafter, the DSM controller 50 calculates the control input Ucain by adding the correction value Rdne to a gain-adjusted value u, and hence to correct the control input Ucain to a smaller value, the correction value Rdne is only required to be set to a negative value. In addition, since the degree of increase of the inertial force is reflected in the engine speed change amount DNE, the correction value Rdne is only required to be calculated based on the engine speed change amount DNE. For the above reason, the correction value Rdne is set to a negative value in the range of DNE1<DNE, and at the same time set to a larger value as the engine speed change amount DNE is larger.

On the other hand, when the engine speed NE suddenly decreases, conversely to the above, the inertial force of the timing chain 4b, the crankshaft 10, and so forth suddenly decreases, whereby the core 34 of the electromagnetic brake 32 rotates relative to the outer casing 33 in a direction opposite to the direction indicated by the arrow Y1 in FIG. 4 while expanding the return spring 36. That is, when the engine speed NE suddenly decreases, the inertial force suddenly decreased thereby acts to retard the cam phase Cain, and hence the control input Ucain required for advancing the cam phase Cain becomes larger than when the engine is in the steady operating condition.

As a result, as shown in FIG. 11, a characteristic curve of the cam phase Cain (indicated by a broken line) exhibited when the engine speed NE suddenly decreases deviates toward the larger value side of the control input Ucain with respect to the characteristic curve (indicated by a solid line) exhibited when the engine is in the steady operation. If the control input Ucain is calculated as a value which repeatedly increases and decreases in a manner inverted between the maximum value Ucainmax and the minimum value Ucainmin, as in the steady operation of the engine, the cam phase Cain is held at the most retarded value Cainrt. Therefore, to compensate for influence of the suddenly decreased inertial force and avoid the state of the cam phase Cain being held at the most retarded value Cainrt, the control input Ucain is only required to be corrected to a larger value depending on the degree of decrease of the inertial force. For the reason described above, in a range of DNE<−DNE1, the correction value Rdne is set to a larger value as the engine speed change amount DNE is larger.

Further, within the range of −DNE1≦DNE≦DNE1, since the engine 3 is in the steady operating condition, the degree of variation in the inertial force of the timing chain 4b, the crankshaft 10, and so forth is small, and influence thereof on the cam phase Cain is negligible, the correction value Rdne is set to a value of 0.

As described above, the two-degree-of-freedom SLD controller 40 and the correction value-calculating section 43 calculate the SLD control input Rsld and the correction value Rdne, respectively, and using these values, the addition element 44 calculates the imaginary control input Rcain by the following equation (19):

$$Rcain(k)=Rsld(k)+Rdne(k) \quad (19)$$

Next, a description will be given of the above-mentioned DSM controller 50, with reference to FIG. 12. The DSM controller 50 calculates the control input Ucain(k) based on the SLD control input Rsld(k) and the correction value Rdne(k) with a control algorithm to which a ΔΣ modulation algorithm is applied, as described hereinbelow.

Figure 12:
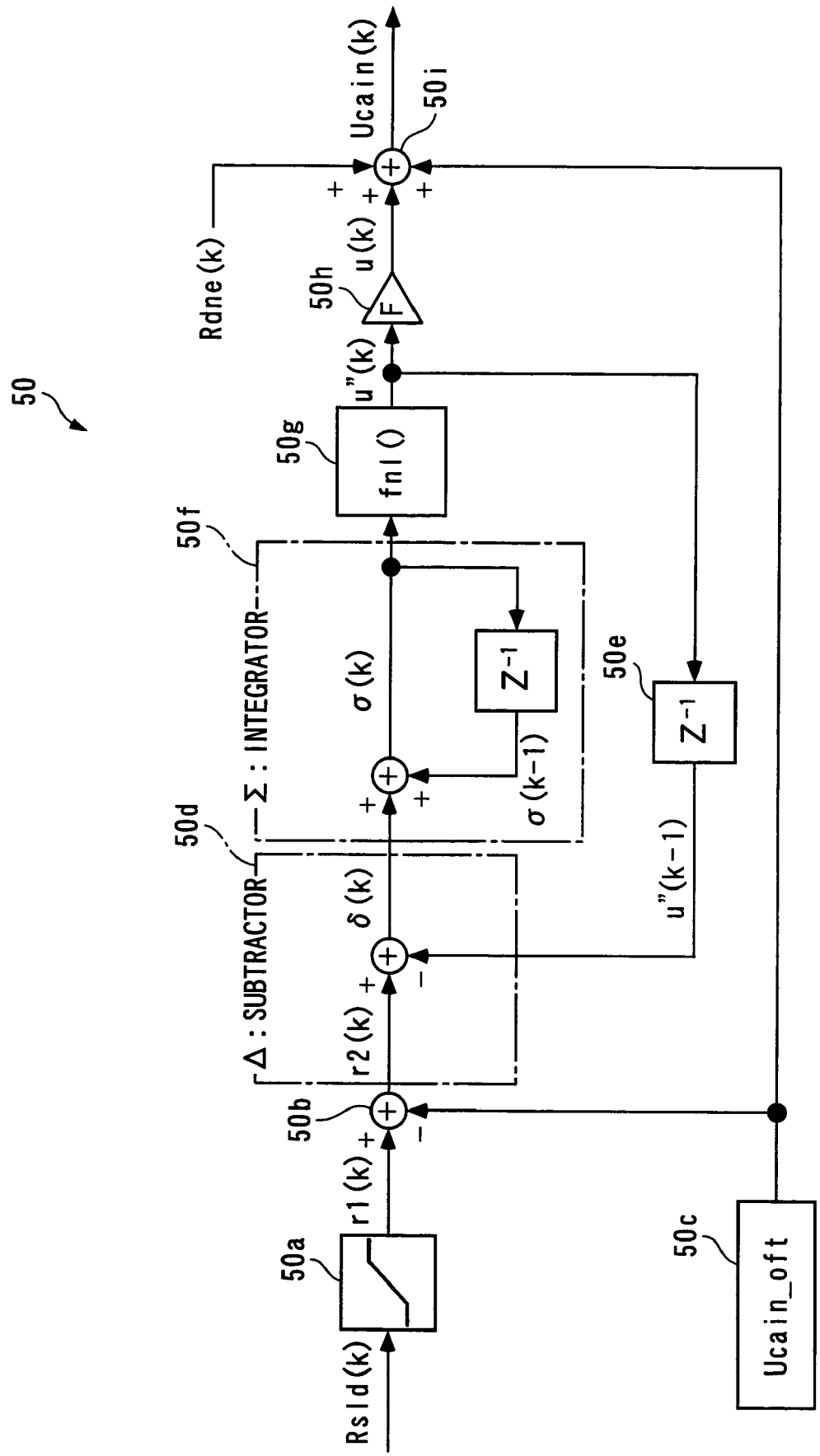
FIG. 12 is a schematic block diagram of a DSM controller.

More specifically, referring to FIG. 12, when the SLD control input Rsld(k) from the two-degree-of-freedom SLD controller 40 is input to a limiter 50a, the limiter 50a subjects the SLD control input Rsld(k) to a limiting process to thereby generate a limited value r1(k), and a subtractor 50b generates a limited value different r2(k) as the difference between the limited value r1(k) and a predetermined offset value Ucain_oft from an offset value generator 50c. Further, a subtractor 50d generates a difference signal value δ (k) as the difference between the restricted value difference r2(k) and a modulation output U"(k−1) delayed by a delay element 50e.

Next, an integrator 50f generates a difference integral value σ(k) as the sum of the difference signal value δ(k) and the delayed value σ(k−1) of the difference integral value, and then a relay element 50g generates the modulation output u"(k) as a predetermined value +R/−R based on the difference integral value σ(k). Then, an amplifier 50h generates the gain-adjusted value u(k) as a control value, by subjecting the modulation output u"(k) to a gain adjustment using a predetermined amplitude adjustment gain F (=KDSM). Then, an addition element 50i generates the control input Ucain(k) as the sum of the predetermined offset value Ucain_oft from the signal generator 50c, the gain adjusted value u(k), and the correction value Rdne.

The control algorithm of the DSM controller 50 is represented by the following equations (20) to (26):

$$r1(k)=Lim(Rsld(k)) \quad (20)$$

$$r2(k)=r1(k)-Ucain\_oft \quad (21)$$

$$\delta(k)=r2(k)-u"(k-1) \quad (22)$$

$$\sigma(k)=\sigma(k-1)+\delta(k) \quad (23)$$

$$u"(k)=fnl(\sigma(k)) \quad (24)$$

$$u(k)=KDSM \cdot u"(k) \quad (25)$$

$$Ucain(k)=Ucain\_oft+u(k)+Rdne(k) \quad (26)$$

In the above equation (20), Lim(Rsld(k)) represents the limited value obtained by subjecting the SLD control input Rsld(k) to the limiting process by the limiter 50a, and is more specifically, calculated as a value obtained by limiting the SLD control input Rsld(k) to a value within a range defined by a predetermined lower limit value rmin and a predetermined upper limit value rmax. That is, when Rsld (k)<rmin holds, Lim(Rsld(k)) is set to rmin; when rmin≦Rsld(k)≦rmax holds, Lim(Rsld(k)) is set to Rsld(k); and when Rsld(k)>rmin holds, Lim(rsld(k)) is set to rmax. These lower and upper limit values rmin and rmax are both set to predetermined positive values, for the reason described hereinafter.

Further, in the equation (24), fnl(σ(k)) is a nonlinear function corresponding to the relay element 50g, and the value thereof is calculated such that when. σ(k)≧0 holds, fnl(σ(K)) is set to R, and when σ(k)<0 holds, fnl(σ(k)) is set to −R (it should be noted that when σ(k)=0 holds, fnl(σ(k)) may be set to 0). Further, the value R is set to a predetermined positive value which always satisfies the relationship of −R>|r2(k)|, for the reason described below. Further, KDSM in the equation (25) is an amplitude adjustment gain corresponding to the amplitude adjustment gain F, which is set to a value of 1 for the reason described hereinafter.

The DSM controller 50 calculates the control input Ucain with the control algorithm based on the ΔΣ modulation algorithm, and hence when the variable cam phase mechanism 30 is controlled by the control input Ucain, to ensure excellent controllability and high control accuracy, the control input Ucain is required to be calculated as a value which increases and decreases in a manner frequently repeatedly inverted between the maximum value Ucainmax and the minimum value Ucainmin, and the ratio between the frequency of inversion toward the maximum value Ucainmax and that of inversion toward the minimum value Ucainmin becomes close to 0.5. Therefore, to realize this, as described hereinbefore, the SLDI control input Rsld is calculated as a positive value, and the predetermined value R, the upper and lower limit values rmin and rmax of the limiting process, and the offset value Ucain_oft are set to the aforementioned values.

Further, since the control input Ucain is calculated as the sum of the offset value Ucain_oft, the gain-adjusted value u, and the correction value Rdne, even when the engine speed NE suddenly changes, the influence of a sudden change in the inertial force of the timing chain 4b, the crankshaft 10, and so forth, caused by the sudden change in the engine speed NE can be compensated for, whereby the control input Ucain can be calculated as a value which increases and decreases in a manner frequently repeatedly inverted between the maximum value Ucainmax and the minimum value Ucainmin. This makes it possible to ensure excellent controllability and high control accuracy.

Figure 13:
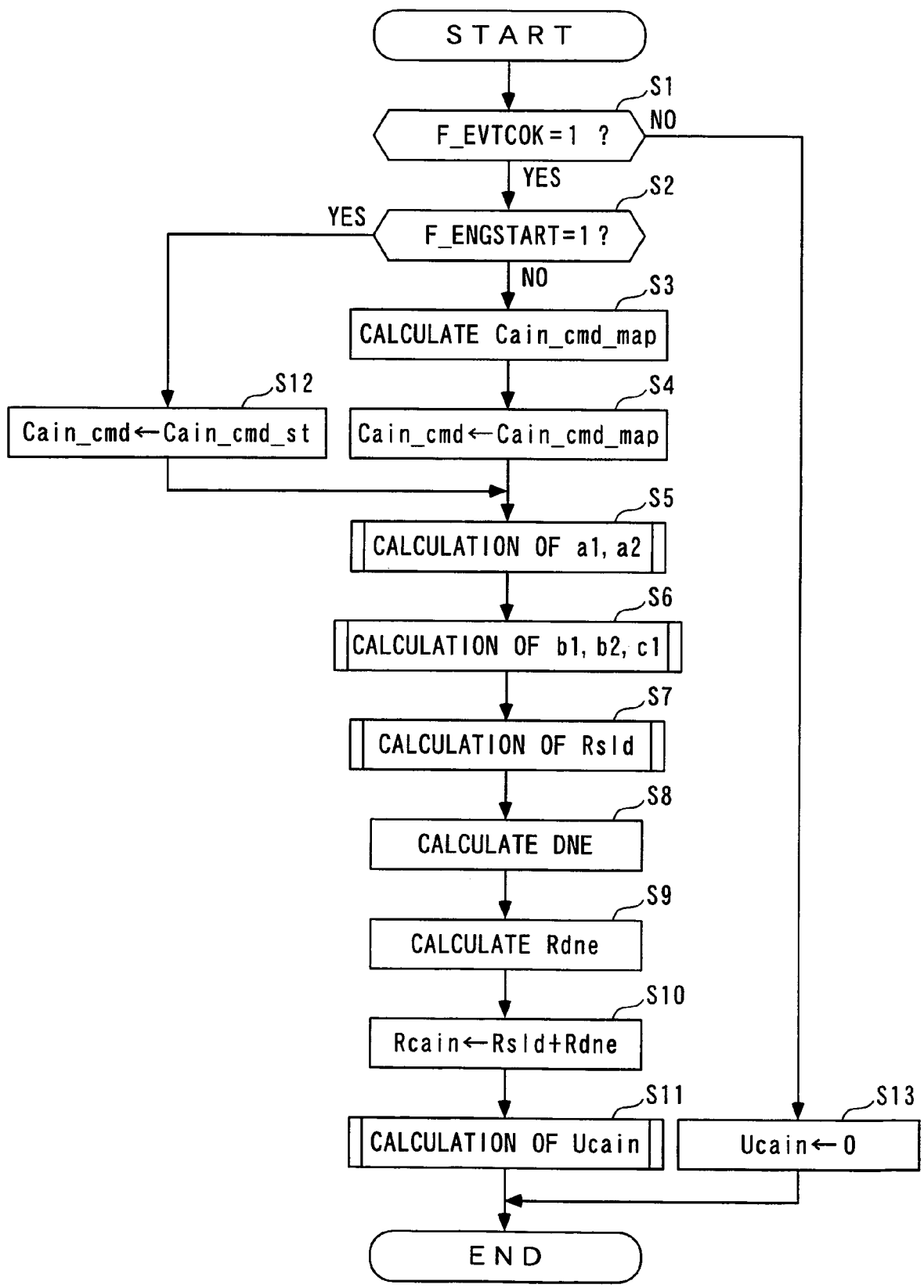
FIG. 13 is a flowchart showing a cam phase control process.

Hereafter, the cam phase control process executed by the ECU 2 will now be described with reference to FIG. 13. As shown in FIG. 13, in the cam phase control process, it is determined in a step 1 (shown as S1 in abbreviated form in FIG. 13; the following steps are also shown in abbreviated form) whether or not a flag F_EVTCOK is equal to 1. The flag F_EVTCOK is set to 1 when the variable cam phase mechanism 30 is determined to be normal by a failure determination process, not shown, and to 0 when the same is determined to be faulty.

If the answer to the question of the step S1 is affirmative (YES), i.e. if the variable cam phase mechanism 30 is normal, the process proceeds to a step 2, wherein it is determined whether or not an engine start flag F_ENG- START is equal to 1. The flag F_ENGSTART is set to 1 when the engine is being started, and to 0 when the engine has been started.

Figure 14:
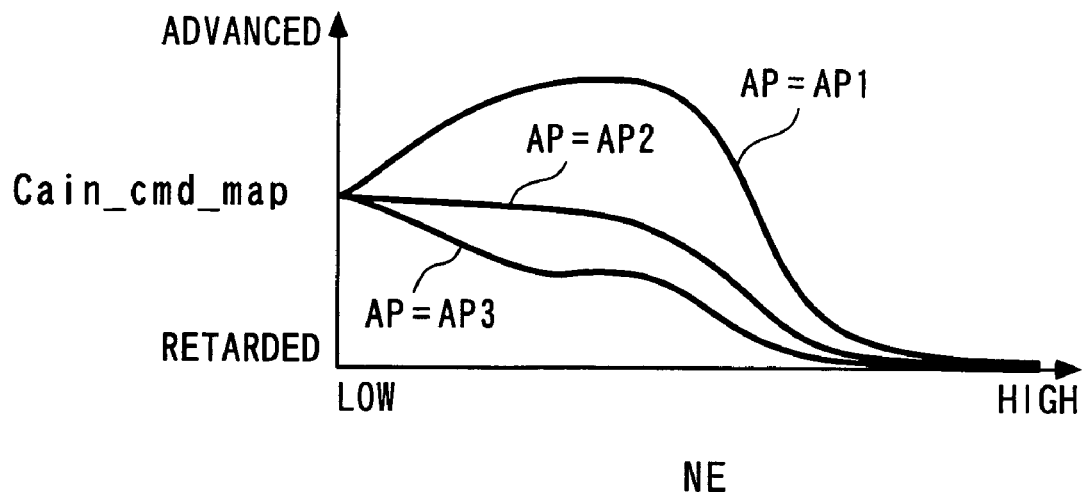
FIG. 14 is a diagram showing an example of a map for use in calculating a map value of a target cam phase.

If the answer to the question of the step 2 is negative (NO), i.e. if the engine has been started, the process proceeds to a step 3, wherein a target cam phase map value Cain_cmd_map is calculated by searching a map shown in FIG. 14 according to the engine speed NE and the accelerator opening AP. In FIG. 14, AP1 to AP3 represent predetermined values of the accelerator opening AP which satisfy the relationship of AP1<AP2<AP3. In this map, the target cam phase Cain_cmd is set to a more advanced value when the accelerator opening AP is small and the engine speed NE is in a medium speed range than otherwise. This is because it is necessary, in such an operating condition, to reduce the internal EGR amount and thereby reduce the pumping loss.

Next, the process proceeds to a step 4, wherein the map value Cain_cmd_map is set to the target cam phase Cain_cmd. Then, the process proceeds to a step 5, wherein the model parameters a1 and a2 are calculated, as described above. More specifically, the basic values a1_bs and a2_bs are calculated by searching the table in FIG. 8 according to the engine speed NE, and the correction coefficient Kasc is calculated by searching the table in FIG. 9 according to the cam phase Cain. Further, the model parameters a1 and a2 are calculated by the aforementioned equations (8) and (9).

In a step of following the step 5, with the sequential identification algorithm expressed by the equations (10) to (17), the model parameters b1 and b2 and the disturbance estimated value c1 are calculated. Next, in a step 7, with the target value filter-type two-degree-of-freedom sliding mode control algorithm expressed by the equations (1) to (6), the SLD control input Rsld is calculated.

Figure 10:
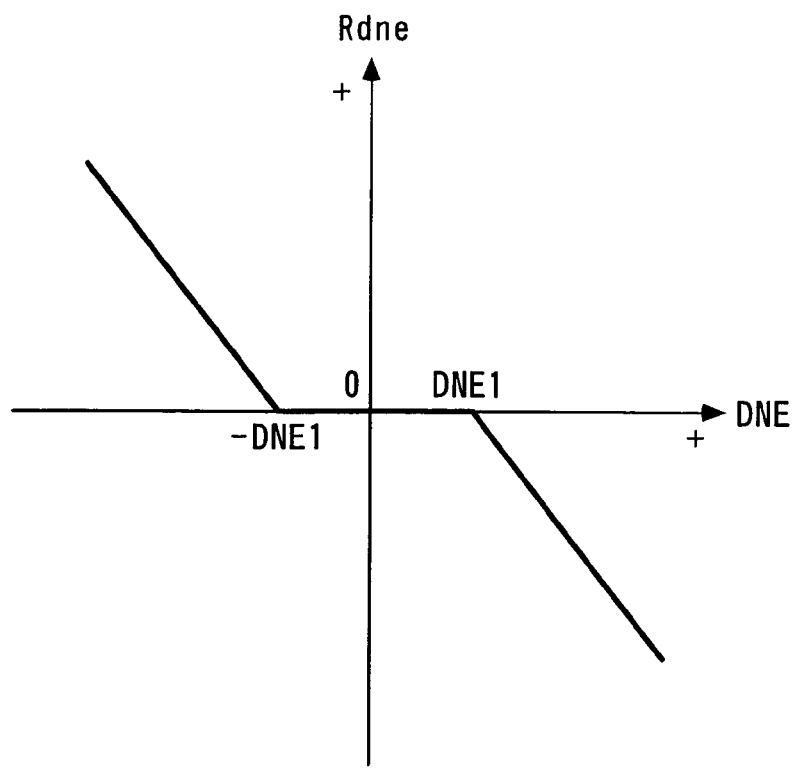
FIG. 10 is a diagram showing an example of a table for use in calculating a correction value Rdne.

Then, in a step 8, the engine speed change amount DNE is calculated by subtracting the immediately preceding value NE(k−1) of the engine speed from the current value NE(k) of the engine speed, and thereafter, in a step 9, the correction value Rdne is calculate by searching the table shown in FIG. 10 according to the engine speed change amount DNE, as described above.

Next, the process proceeds to a step 10, wherein the imaginary control input Rcain is set to the sum of the SLD control input Rsld calculated in the step 7 and the correction value Rdne calculated in the step 9. The imaginary control input Rcain is stored in the RAM, and used as the immediately preceding value Rcain(k−1) of the imaginary control input e.g. during execution of the cam phase control process on a next occasion.

Next, in a step 11, the control input Ucain is calculated with the control algorithm expressed by the aforementioned equations (20) to (26), followed by terminating the present process.

On the other hand, if the answer to the question of the step 2 is affirmative (YES), i.e. if the engine is being started, the process proceeds to a step 12, wherein the target cam phase Cain_cmd is set to a predetermined start-time value Cain_cmd_st. Then, the steps 5 to 11 are executed, followed by terminating the present process.

On the other hand, if the answer to the question of the step 1 is negative (NO), i.e. if the variable cam phase mechanism 30 is faulty, the process proceeds to a step 13, wherein the control input Ucain is set to a value of 0, followed by terminating the present process. This caused the cam phase Cain to the most retarded value Cainrt.

Figure 15:
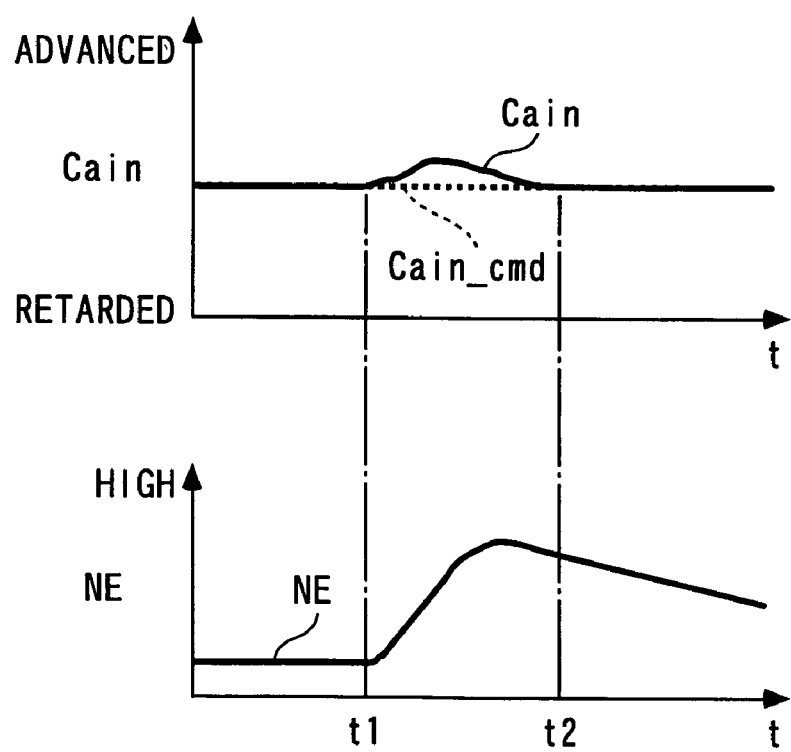
FIG. 15 is a timing diagram showing an example of results of control by the cam phase control system according to the first embodiment.
Figure 16:
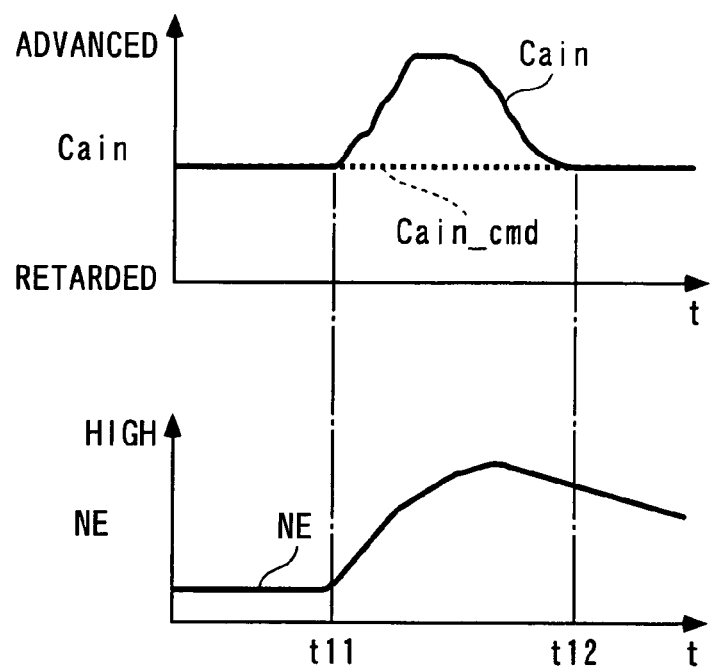
FIG. 16 is a timing diagram showing results of control of a comparative example.

Next, a description will be given of results of the cam phase control by the cam phase control system 1 constructed above according to the present embodiment. FIG. 15 shows an example of results of the control by the cam phase control system 1 according to the present embodiment when the engine speed NE suddenly increases in a state where the target cam phase Cain_cmd is held at a fixed value. FIG. 16 shows, for comparison, an example of results of the control obtained when the engine speed NE suddenly increases in a state where the target cam phase Cain_cmd is held at a fixed value, and at the same time the correction value Rdne is set to 0.

The comparison of these figures shows that when the engine speed NE starts to increase (at times t1 and t11), the degree of deviation of the cam phase Cain from the target cam phase Cain_cmd thereafter is smaller in the case of the example of the present embodiment than in the case of the comparative example. Further, the time which the cam phase Cain takes to converge to the target cam phase Cain_cmd is also shorter in the case (t1 to t2) of the present embodiment than in the case (t11 to t12) of the comparative example. Thus, according to the cam phase control system 1 of the present embodiment, it is understood that even when a sudden change in the inertial force acting on the variable cam phase mechanism 30 has been caused by a sudden change in the engine speed NE, the influence of the sudden change in the inertial force can be properly compensated for, by calculating the control input Ucain using the correction value Rdne.

As described above, according to the cam phase control system 1 of the present embodiment, the SLD control input Rsld is calculated with the target value-filter type two-degree-of-freedom sliding mode control algorithm, and the SLD control input Rsld is modulated with the control algorithm based on the $\Delta\Sigma$ modulation algorithm, whereby the control input Ucain is calculated. Thus, the control input Ucain is calculated, through modulation of the SLD control input Rsld, as a value which increases and decreases in a manner frequently inverted between the predetermined maximum value Ucainmax and the predetermined minimum value Ucainmin, and therefore it is possible to avoid degradation of the controllability and the control accuracy caused by the nonlinear characteristic of the variable cam phase mechanism 30, compared with the case in which the variable cam phase control mechanism 30 is caused by the SLD control input Rsld alone. Further, since the control input Ucain is calculated as a value corrected by the correction value Rdne, even when a sudden change in the inertial force acting on the variable cam phase mechanism 30 is caused by a sudden change in the engine speed NE, the influence thereof can be properly compensated for, and hence the deviation of the cam phase Cain resulting from the sudden change in the engine speed NE can be suppressed. As a result, it is possible to secure excellent controllability and high control accuracy in the cam phase control.

Further, when the cam phase Cain is controlled via the variable cam phase control system 30 such that it follows up the target cam phase Cain_cmd, as in the case of the cam phase control system 1 of the present embodiment, due to a change in friction of the engine 3 caused by the progress of warming up thereof, a variation in the dynamic characteristics among individual variable cam phase mechanisms 30, and aging, the dynamic characteristics of the model defined by the expression (7) can deviate from the actual values, which can cause the cam phase Cain to experience an oscillating behavior, overshooting, and an error, with respect to the target cam phase Cain_cmd. Since the control input Ucain is calculated as a value corrected by the correction value Rdne according to the engine speed NE, when the engine speed NE changes over a wide range, the degree of the correction becomes large to cause the correction value Rdne to act as a disturbance, which can make the above problem more conspicuous.

However, in the present embodiment, since the SLD control input Rsld is calculated with the target value-filer type two-degree-of-freedom sliding mode control algorithm, the cam phase Cain can be caused to accurately and promptly follow up the target cam phase Cain_cmd while avoiding the above-mentioned oscillating behavior and overshooting. What is more, while the parameter scheduler 41 calculates the model parameters a1 and a2 based on the engine speed NE and the cam phase Cain, and the partial parameter identifier 42 performs onboard identification of the model parameters b1 and b2 and the disturbance estimated value c1, the SLD control input Rsld is calculated using the model parameters a1, a2, b1, and b2 and the disturbance estimated value c1 and the correction value Rdne, which are calculated as described above. Therefore, the influence of the correction value Rdne as the disturbance and modeling error caused by a change in the friction can be properly compensated for, which makes it possible to cause the dynamic characteristics of the model to match the actual dynamic characteristics. As a result, it is possible to improve the controllability and control accuracy of the cam phase control.

Further, since the present control system is configured such that the model parameters a1 and a2 can be calculated by the parameter scheduler 41, the computation time can be shortened compared with the case where these values are also identified by the partial parameter identifier 42, and hence computation load on the ECU 2 can be reduced.

Although the first embodiment is an example which uses the electromagnetic variable cam phase mechanism 30 in which the electromagnetic force Fsol of the electromagnet 35 acts as the first force, and the urging force Fspr of the return spring 36 acts as the second force, this is not limitative, but any variable cam phase mechanism can be used in the present invention insofar as it changes the cam phase Cain by changing the magnitude relationship between the two forces, and holds the cam phase Cain by controlling the two forces to a balanced relationship. For example, there may be employed a variable cam phase mechanism in which two electromagnetic forces act as the first and second forces in the advancing and retarding directions of the cam phase Cain, respectively, and by controlling the two electromagnetic forces to the balanced state, the cam phase Cain is held thereafter at a value assumed at the time.

Figure 17:
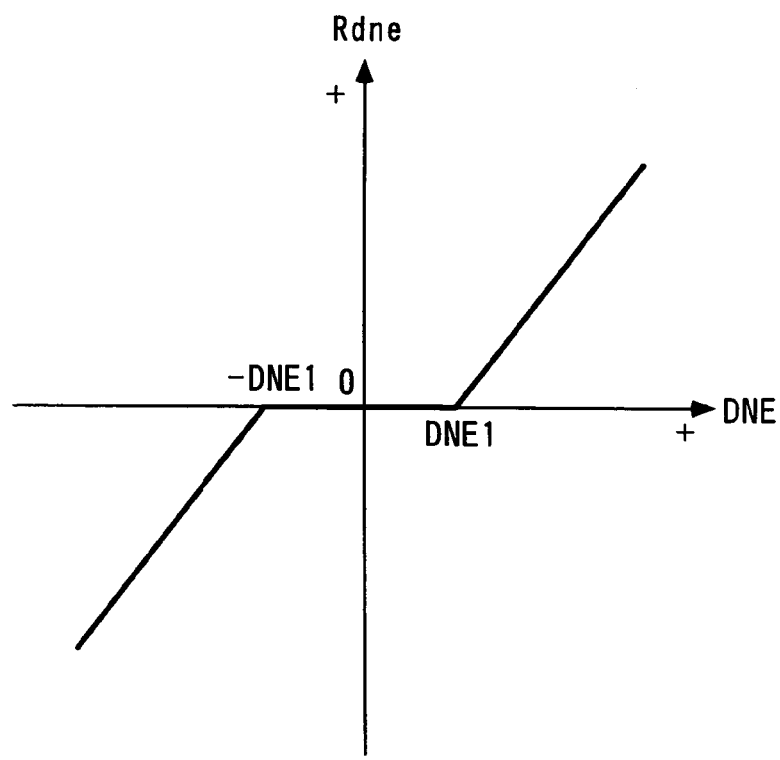
FIG. 17 is a diagram showing a variation of the table for use in calculating the correction value Rdne.

Further, although in the first embodiment, since the cam phase Cain deviates toward the advanced side when the engine speed NE suddenly increases and deviates toward the retarded side when the same suddenly decreases, due to the structure of the variable cam phase mechanism 30 described above, the cam phase control system is configured such that the correction value Rdne is calculated using the table shown in FIG. 10, this is not limitative, but conversely to the above, assuming that the variable cam phase mechanism 30 is configured such that the cam phase Cain deviates toward the retarded side when the engine speed NE suddenly increases and deviates toward the advanced side when the engine speed NE suddenly decreases, it is only required that the correction value Rdne is calculated using the table shown in FIG. 17.

Further, although the first embodiment is an example which uses the control algorithm based on the target value filter-type two-degree-of-freedom sliding mode control algorithm and the $\Delta\Sigma$ modulation algorithm as predetermined algorithms for calculating a control value for causing the cam phase Cain to follow up the target cam phase Cain_cmd, this is no limitative, but any predetermined suitable control algorithm may be employed insofar as the it is capable of causing the cam phase Cain to follow up the target cam phase Cain_cmd. For example, there may be employed a general feedback control algorithm, such as a PID control algorithm. Furthermore, although the first embodiment is an example which uses the target value filter-type two-degree-of-freedom sliding mode control algorithm as a predetermined follow-up control algorithm, this is not limitative, but any suitable follow-up control algorithm may be employed insofar as it can cause the cam phase Cain to follow up the target cam phase Cain_cmd. For example, there may be employed a general feedback control algorithm, such as a PID control algorithm.

Moreover, although the first embodiment is an example using the sliding mode control algorithm as the response-specifying control algorithm, this is not limitative, but any response-specifying control algorithm including a back-stepping control algorithm may be used so long as it can specify the rate of convergence of the cam phase Cain to the target cam phase Cain_cmd.

Further, although the first embodiment is an example using the target value filter-type two-degree-of-freedom sliding mode control algorithm as the two-degree-of-freedom algorithm, this is not limitative, but it is understood that any suitable two-degree-of-freedom algorithm may be used. For example, there may used a combination of a first-order delay filter algorithm and a feedback control algorithm, such as a PID control algorithm.

Furthermore, although the first embodiment is an example in which the control input Ucain is calculated by adding the correction value Rdne to the gain-adjusted value u, this is not limitative but any suitable method of calculating the control input Ucain may be used insofar as it calculates the control input Ucain by correcting the gain-adjusted value u according to the engine speed NE. For example, the control system may be configured such that a correction coefficient is calculated based on the engine speed change amount DNE and the control input Ucain is calculated by multiplying the sum of the gain-adjusted value u and the offset value Ucain_oft by the correction coefficient.

Further, although the first embodiment is an example in which the model parameters a1 and a2 are calculated by the parameter scheduler 41, and the model parameters b1 and b2 and the disturbance estimated value c1 are calculated by the partial parameter identifier 42, this is not limitative but any suitable calculation methods may be employed so long as these values are properly calculated. For example, the model parameters a1, a2, b1, and b2 may be calculated by the parameter scheduler based on the engine speed NE and the cam phase Cain, and the disturbance estimated value c1 may be calculated by an adaptive disturbance observer. Alternatively, the model parameters a1, a2, b1, and b2 may be calculated by an onboard identifier of a variable-gain type or a fixed-gain type, and the disturbance estimated value c1 may be calculated by the adaptive disturbance observer.

Moreover, although the first embodiment is an example in which the control input Ucain is directly input to the variable cam phase mechanism 30, this is not limitative but a value obtained by processing the control input Ucain by an electric circuit and a controller other than the above may be input to the variable cam phase mechanism 30. For example, the control input Ucain may be further modulated by a PMW circuit, and the modulated value of the control input Ucain may be input to the variable cam phase mechanism 30.

Further, the first embodiment is an example in which the variable cam phase mechanism 30 is used for changing the cam phase Cain of the intake cam 5, this is not limitative but the variable cam phase mechanism 30 may be used for changing the cam phase of the exhaust cam 8 with respect to the crankshaft 10.

Next, a description will be given of a cam phase control system 1A according to a second embodiment of the present invention. The cam phase control system according to the second embodiment 1A is distinguished from the cam phase control system 1 according to the first embodiment, only in that a SDM controller 60 shown in FIG. 18 replaces the DSM controller 50, and is constructed similarly to the cam phase control system 1 according to the first embodiment in the other respects. Therefore, the following description will be given only of the SDM controller 60. The SDM controller 60 calculates the control input Ucain(k) based on the SLD control input Rsld(k) and the correction value Rdne(k) with a control algorithm to which the $\Sigma\Delta$ modulation algorithm is applied. In the present embodiment, the SDM controller 60 corresponds to the control value-calculating means and the control input-calculating means.

Figure 18:
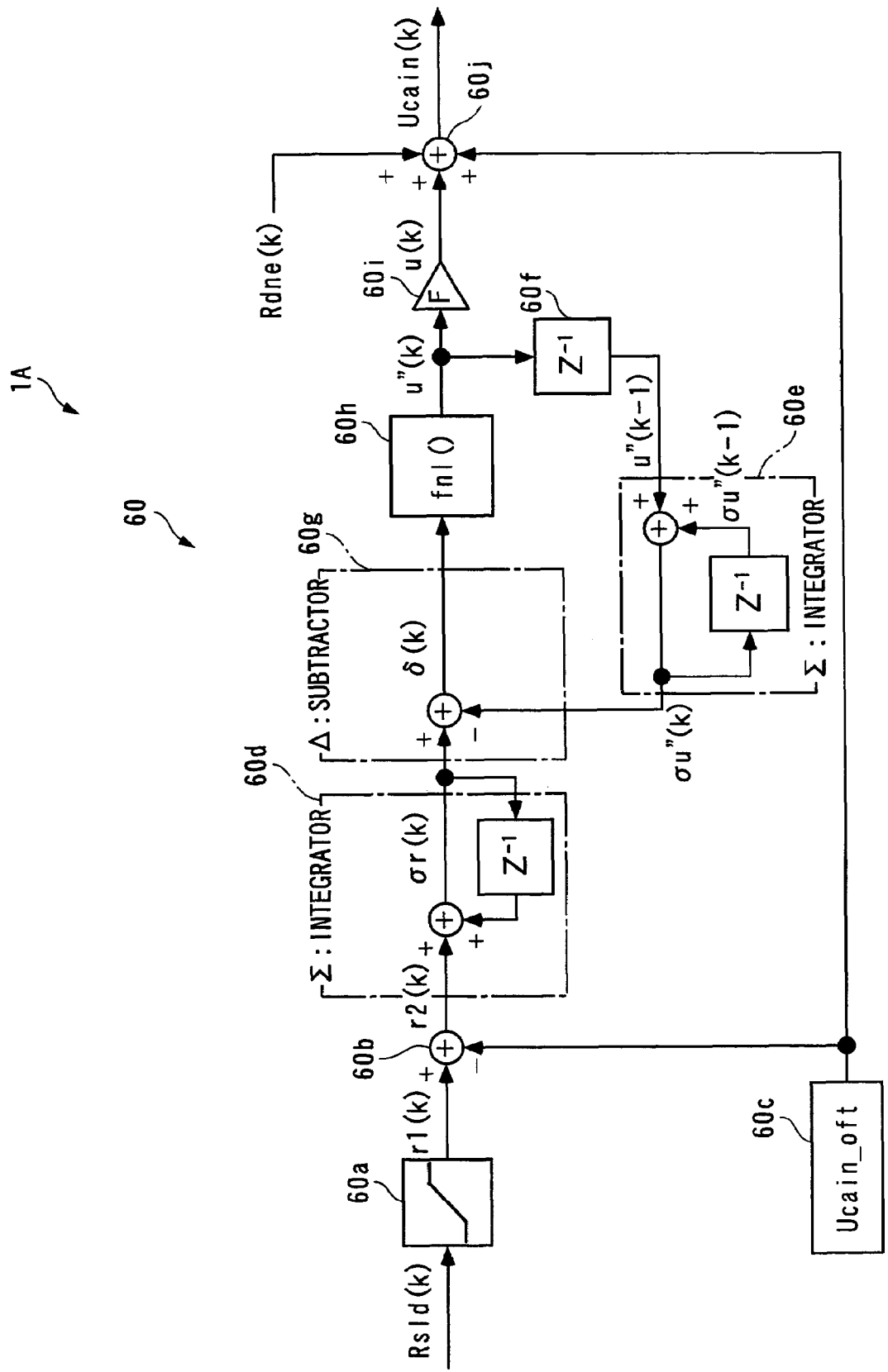
FIG. 18 is a schematic block diagram of an SDM controller of a cam phase control system according to a second embodiment of the present invention.

In the SMD controller 60, as shown in FIG. 18, when the SLD control input Rsld(k) from the SLD controller 40 is input to a limiter 60a, the limiter 60a generates a limited value r1(k), and then a subtractor 60b generates a limited value difference r2(k) as the difference between the limited value r1(k) and a predetermined offset value Ucain_oft from an offset value generator 60c. Next, an integrator 60d generates a difference integral value $\sigma r(k)$ as the sum of the limited value difference r2(k) and a delayed value $\sigma r(k-1)$ of the difference integral value. On the other hand, an integrator 60e generates a modulation output integral value $\sigma''(k)$ as the sum of the modulation output u''(k−1) delayed by a delay element 60f and the delayed value $\sigma u''(k-1)$ of the modulation output integral value. Then, a subtractor 60g generates a difference signal value $\delta(k)$ as the difference between the difference integral value $\sigma r(k)$ and the modulation output integral value $\sigma u''(k)$ Next, a relay element 60h generates the modulation output u''(k) as a predetermined value +R/−R based on the difference signal value $\delta(k)$. Then, an amplifier 60i generates a gain-adjusted value u(k), by subjecting the modulation output u''(k) to a gain adjustment using a predetermined amplitude adjustment gain F (=KDSM). Then, an addition element 60j generates the control input Ucain(k) as the sum of the gain-adjusted value u(k), the aforementioned offset value Ucain_oft, and the correction value Rdne(k).

The control algorithm of the DSM controller 60 is represented by the following equations (27) to (34):

$$r1(k)=Lim(Rsld(k)) \tag{27}$$

$$r2(k)=r1(k)-Ucain\_oft \tag{28}$$

$$\sigma r(k)=\sigma r(k-1)+r2(k) \tag{29}$$

$$\sigma u''(k)=\sigma u''(k-1)+u''(k-1) \tag{30}$$

$$\delta(k)=\sigma r(k)-u''(k) \tag{31}$$

$$u''(k)=fnl(\delta(k)) \tag{32}$$

$$u(k)=KDSM\cdot u''(k) \tag{33}$$

$$Ucain(k)=Ucain\_oft+u(k)+Rdne(k) \tag{34}$$

The range of limitation of the limited value Lim(Rsld(k)) in the above equation (27) is set to the same range as that in the aforementioned equation (20). Further, the nonlinear function fnl ($\delta(k)$) in the equation (32) is configured such that when $\delta(k) \geq 0$ holds, fnl ($\delta(k)$) becomes equal to R, whereas when $\delta(k)<0$ holds, fnl $\delta(k)$ becomes equal to −R (it should be noted that when $\delta(k)=0$ holds, fnl($\delta(k)$) may be configured to become equal to 0.)

Further, for the reason described above, the predetermined value R is set to a positive value which always satisfies the relationship of R>|r2(k)|. Further, the offset value Ucain_oft in the equations (28) and (34) and the amplitude adjustment gain KDSM in the equation (32) are set to respective appropriate values (KDSM$\leq$1) which makes it possible to avoid the inversion of the sign of the control input Ucain.

According to the SDM controller 60 described above, the control input Ucain is calculated as a value which is obtained by modulating the SLD input Rsld with the control algorithm based on the $\Sigma\Delta$ modulation algorithm, and further by correcting the same by the correction value Rdne. Therefore, the cam phase control system 1A can also provide the same advantageous effects as provided by the cam phase control system 1 according to the first embodiment described hereinabove.

Next, a description will be given of a cam phase control system 1B according to a third embodiment of the present invention. The cam phase control system according to the third embodiment 1B is distinguished from the cam phase control system 1 according to the first embodiment, only in that a DM controller 70 shown in FIG. 19 replaces the DSM controller 50, and is constructed similarly to the cam phase control system 1 according to the first embodiment in the other respects. Therefore, the following description will be given only of the DM controller 70. The DM controller 70 calculates the control input Ucain(k) based on the SLD control input Rsld(k) and the correction value Rdne(k) with a control algorithm to which the $\Delta$ modulation algorithm is applied. In the present embodiment, the DM controller 70 corresponds to the control value-calculating means and the control input-calculating means.

Figure 19:
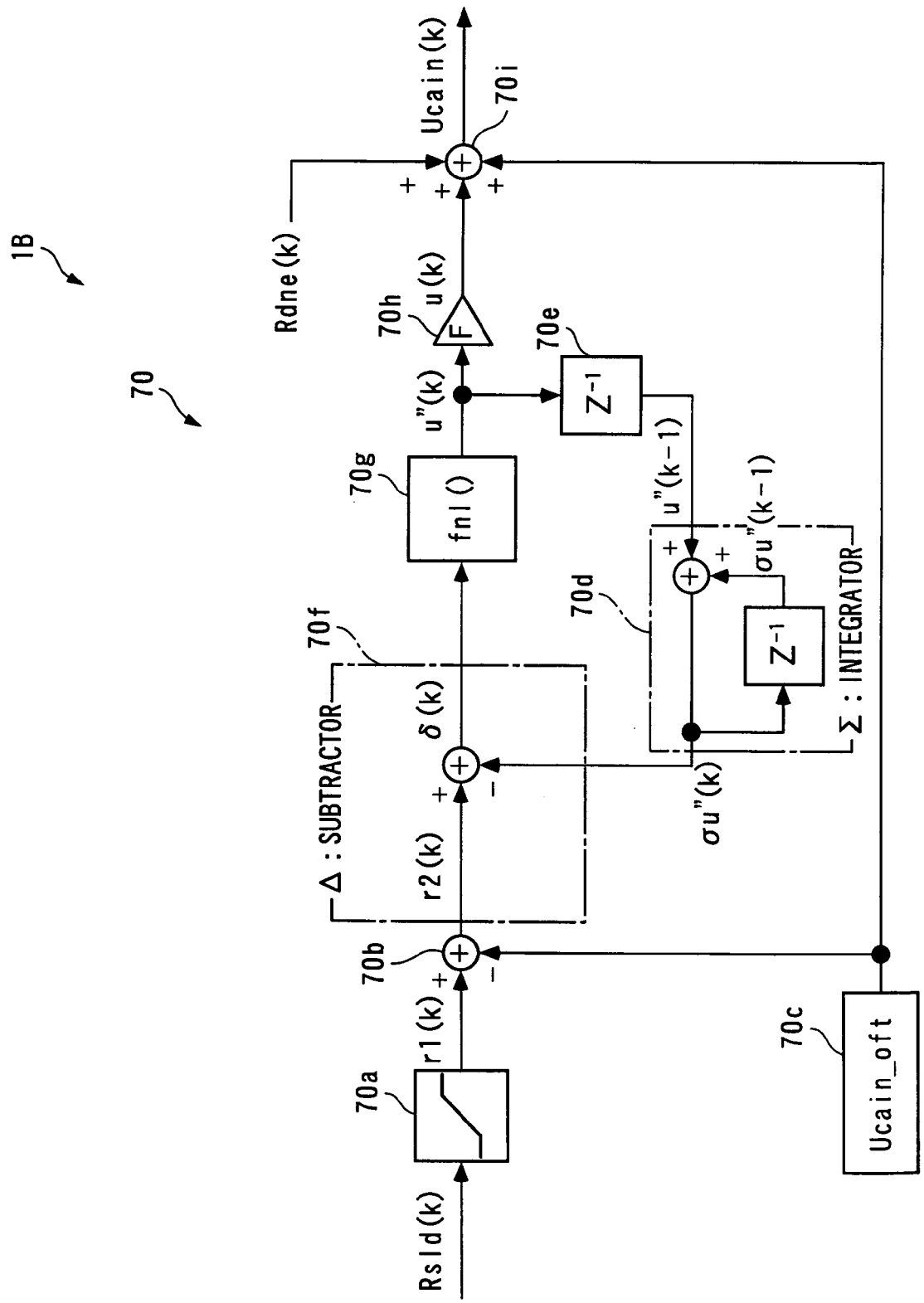
FIG. 19 is a schematic block diagram of a DM controller of a cam phase control system according to a third embodiment of the present invention.

In the DM controller 70, as shown in FIG. 19, when the SLD control input Rsld(k) from the SLD controller 40 is input to a limiter 70a, the limiter 70a generates a limited value r1(k), and then a subtractor 70b generates a limited value difference r2(k) as the difference between the limited value r1(k) and a predetermined offset value Ucain_oft from an offset value generator 70c. On the other hand, an integrator 70d generates a modulation output integral value $\sigma''(k)$ as the sum of the modulation output u''(k−1) delayed by a delay element 70e and the delayed value $\sigma u''(k-1)$ of the modulation output integral value. Then, a subtractor 70f generates a difference signal value $\delta(k)$ as the difference between the limited value difference r2(k) and the modulation output integral value $\sigma u''(k)$.

Next, a relay element 70g generates the modulation output u''(k) as a predetermined value +R/−R based on the difference signal value $\delta(k)$. Then, an amplifier 70h generates a gain-adjusted value u(k), by subjecting the modulation output u''(k) to a gain adjustment using a predetermined amplitude adjustment gain F (=KDSM). Then, an addition element 70i generates the control input Ucain(k) as the sum of the gain-adjusted value u(k), the aforementioned offset value Ucain_oft, and the correction value Rdne(k).

The control algorithm of the DM controller 70 is represented by the following equations (35) to (41):

$$r1(k)=Lim(Rsld(k)) \tag{35}$$

$$r2(k)=r1(k)-Ucain\_oft \tag{36}$$

$$\sigma u''(k)=\sigma u''(k-1)+u''(k-1) \quad (37)$$

$$\delta(k)=r2(k)-\sigma u''(k) \quad (38)$$

$$u''(k)=fnl(\delta(k)) \quad (39)$$

$$u(k)=KDSM \cdot u''(k) \quad (40)$$

$$Ucain(k)=Ucain\_oft+u(k)+Rdne(k) \quad (41)$$

The range of limitation of the limited value Lim(Rsld(k)) in the equation (35) is set to the same range as that in the aforementioned equations (20) and (27). Further, the non-linear function fnl ($\delta(k)$) in the equation (39) is also set to the same value as that in the aforementioned equation (32). That is, the nonlinear function fnl ($\delta(k)$) in the equation (39) is configured such that when $\delta(k) \geq 0$ holds, fnl ($\delta(k)$) becomes equal to R, whereas when $\delta(k) < 0$ holds, fnl $\delta(k)$ becomes equal to $-R$ (it should be noted that when $\delta(k)=0$ holds, fnl($\delta(k)$) may be configured to become equal to 0.)

Further, for the reason described above, the predetermined value R is set to a positive value which always satisfies the relationship of R>|r2(k)|. Further, the offset value Ucain_oft in the equations (36) and (41) and the amplitude adjustment gain KDSM in the equation (40) are, as described above, set to respective appropriate values which make it possible to avoid the inversion of the sign of the control input Ucain (KDSM$\leq$1).

According to the DM controller 70 described above, the control input Ucain is calculated as a value which is obtained by modulating the SLD input Rsld with the control algorithm based on the $\Delta$ modulation algorithm, and further by correcting the same by the correction value Rdne. Therefore, the cam phase control system 1B according to the present embodiment can also provide the same advantageous effects as provided by the cam phase control system 1 according to the first embodiment described hereinabove.

It is further understood by those skilled in the art that the foregoing are preferred embodiments of the invention, and that various changes and modifications may be made without departing from the spirit and scope thereof.

What is claimed is:

1. A cam phase control system for an internal combustion engine, for controlling a cam phase as a phase of at least one of an intake cam and an exhaust cam relative to a crankshaft, comprising:
    a variable cam phase mechanism that changes a magnitude relationship between a first force that acts in a direction of advancing the cam phase and a second force that acts in a direction of retarding the cam phase, to thereby change the cam phase, and holds the first and second forces in a balanced relationship, to thereby hold the cam phase;
    engine speed-detecting means for detecting an engine speed of the engine;
    cam phase-detecting means for detecting the cam phase;
    target cam phase-setting means for setting a target cam phase as a target to which the cam phase is controlled;
    control value-calculating means for calculating a control value for causing the detected cam phase to follow up the target cam phase, with a predetermined control algorithm; and
    control input-calculating means for correcting the calculated control value according to the detected engine speed to thereby calculate a control input for controlling the variable cam phase mechanism.

2. A cam phase control system as claimed in claim 1, wherein the predetermined control algorithm of said control value-calculating means calculates a follow-up control value for causing the detected cam phase to follow up the target cam phase with a predetermined follow-up control algorithm, and modulates the calculated follow-up control value with an algorithm which is based on one of a $\Delta$ modulation algorithm, a $\Delta\Sigma$ modulation algorithm, and a $\Sigma\Delta$ modulation algorithm, to thereby calculate the control value.

3. A cam phase control system as claimed in claim 2, wherein said control input-calculating means calculates a correction value for correcting the control value according to the engine speed, and
    wherein the predetermined follow-up control algorithm of said control value-calculating means is an algorithm which is based on a controlled system model defining a relationship between the follow-up control value, the correction value, and the cam phase,
    the cam phase control system further comprising identification means for identifying model parameters of the controlled system model based on the follow-up control value, the correction value, and the cam phase, with a predetermined identification algorithm.

4. A cam phase control system as claimed in claim 1, wherein the predetermined control algorithm of said control value-calculating means includes a predetermined response-specifying control algorithm.

5. A cam phase control system as claimed in claim 1, wherein the predetermined control algorithm of said control value-calculating means includes a predetermined two-degree-of-freedom control algorithm.

6. A cam phase control system as claimed in any one of claims 1 to 5, wherein said control input-calculating means calculates a correction value for correcting the control value, according to the engine speed,
    the cam phase control system further comprising disturbance estimated value-calculating means for calculating a disturbance estimated value for compensating for disturbance received by said variable cam phase mechanism based on the correction value, with a predetermined estimation algorithm, and
    wherein said control value-calculating means calculates the control value further based on the calculated disturbance estimated value.

* * * * *